(12) United States Patent
Dec

(10) Patent No.: US 7,721,701 B2
(45) Date of Patent: May 25, 2010

(54) ROTARY SCISSORS ACTION MACHINE

(76) Inventor: Andrzej Dec, 948 Rambling Dr., Rochester Hills, MI (US) 48307

( * ) Notice: Subject to any disclaimer, the term of this patent is extended or adjusted under 35 U.S.C. 154(b) by 0 days.

(21) Appl. No.: 12/087,843

(22) PCT Filed: Jan. 12, 2007

(86) PCT No.: PCT/US2007/000842

§ 371 (c)(1), (2), (4) Date: Jul. 16, 2008

(87) PCT Pub. No.: WO2007/084376

PCT Pub. Date: Jul. 26, 2007

(65) Prior Publication Data

US 2009/0047160 A1 Feb. 19, 2009

Related U.S. Application Data

(60) Provisional application No. 60/759,301, filed on Jan. 17, 2006.

(51) Int. Cl.
| | |
|---|---|
| *F02B 53/00* | (2006.01) |
| *F01B 13/04* | (2006.01) |
| *F01C 1/00* | (2006.01) |
| *F04C 18/00* | (2006.01) |
| *F04C 2/00* | (2006.01) |
| *F16H 21/00* | (2006.01) |
| *F16H 3/02* | (2006.01) |

(52) U.S. Cl. ............... 123/245; 123/241; 123/43 B; 123/43 R; 418/34; 418/36; 74/25; 74/745

(58) Field of Classification Search ............... 123/241, 123/245, 234, 43 R, 43 B; 418/33–38; 74/25, 74/745

See application file for complete search history.

(56) References Cited

U.S. PATENT DOCUMENTS

| | | | | |
|---|---|---|---|---|
| 1,034,451 | A | | 8/1912 | Hendricks ............... 123/43 B |
| 2,101,134 | A | * | 12/1937 | Fawick ................... 74/745 |
| 2,182,269 | A | * | 12/1939 | Whritenour ............. 123/245 |
| 3,516,267 | A | * | 6/1970 | Pavel ..................... 74/25 |
| 3,685,928 | A | * | 8/1972 | Munzinger .............. 418/37 |
| 3,901,034 | A | * | 8/1975 | Munzinger .............. 123/234 |
| 4,010,716 | A | * | 3/1977 | Minka .................... 123/245 |
| 4,249,424 | A | * | 2/1981 | Glazier ................... 74/25 |
| 4,800,813 | A | * | 1/1989 | Leyendecker et al. .... 101/409 |
| 4,844,708 | A | * | 7/1989 | Lopez .................... 418/36 |

(Continued)

FOREIGN PATENT DOCUMENTS

WO    WO 2005045197 A1 *   5/2005

*Primary Examiner*—Thai Ba Trieu
(74) *Attorney, Agent, or Firm*—Ernest E. Helms

(57) ABSTRACT

A rotary machine is provided having rotating forward and rearward work members having cyclic non-constant angle motion there between, the machine includes a rotating shaft and a first gear eccentrically mounted with the rotating shaft. A reaction gear in mesh with the first gear causes the first gear to rotate with respect to the rotating shaft. First and second connecting rods are pivotally connected with the first gear. First and second crank arms are pivotally connected with the respective first and second connecting rods. First and second coaxial shafts are connected with the respective first and second first crank arms. The first shaft is connected with at least one forward work member. The second shaft is connected with at least one rearward work member.

20 Claims, 25 Drawing Sheets

U.S. PATENT DOCUMENTS

| | | | | |
|---|---|---|---|---|
| 4,887,560 A | * | 12/1989 | Heniges | 123/78 F |
| 4,901,694 A | * | 2/1990 | Sakita | 123/234 |
| 5,178,038 A | * | 1/1993 | Heniges | 74/591 |
| 5,433,179 A | * | 7/1995 | Wittry | 123/245 |
| 5,685,269 A | * | 11/1997 | Wittry | 123/245 |
| 6,739,307 B2 | | 5/2004 | Morgado | 123/245 |
| 2007/0036667 A1 | * | 2/2007 | Sterk | 123/245 |

* cited by examiner

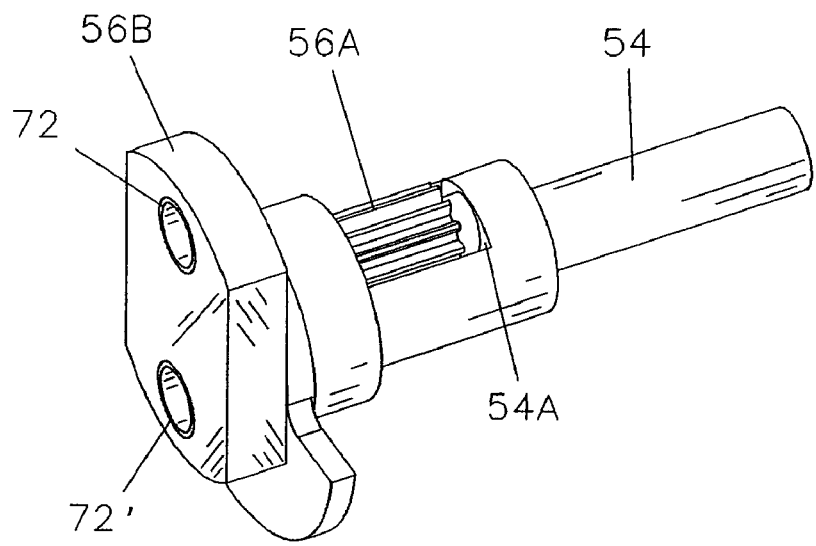
FIG. 5
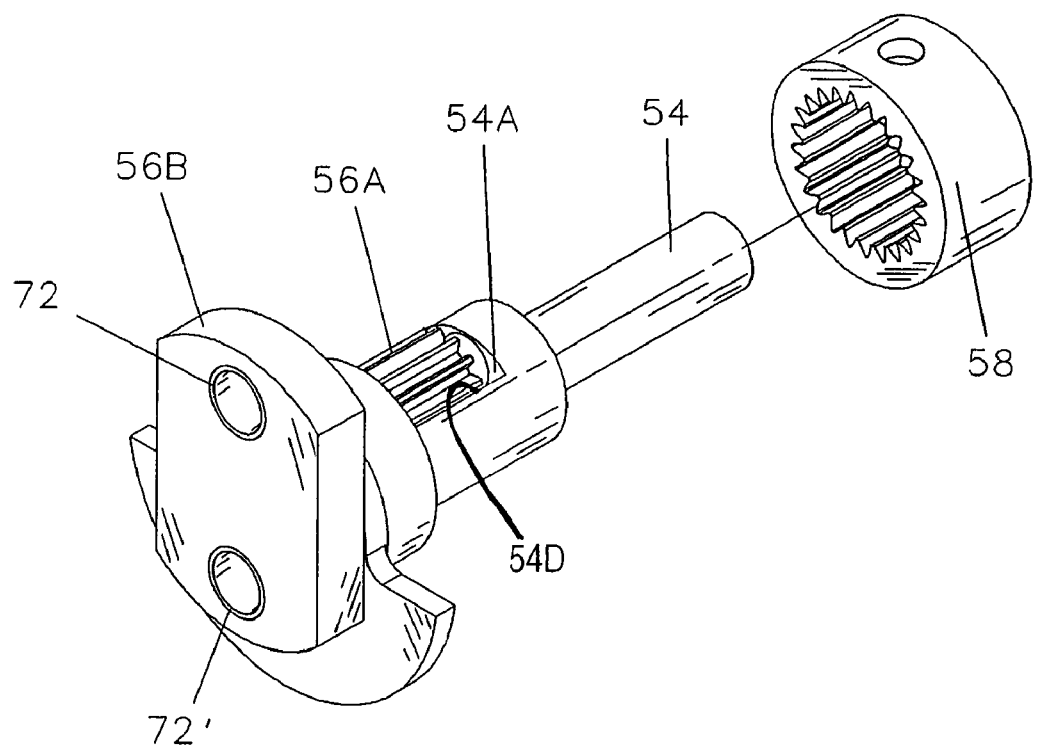
FIG. 6-A

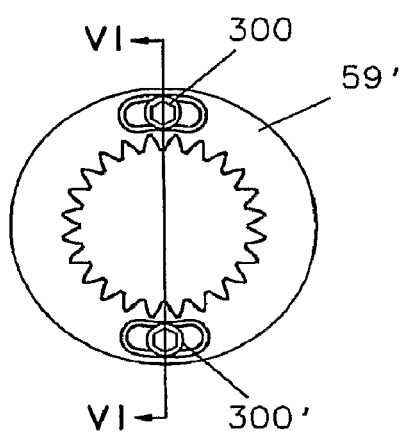
Fig.6-B
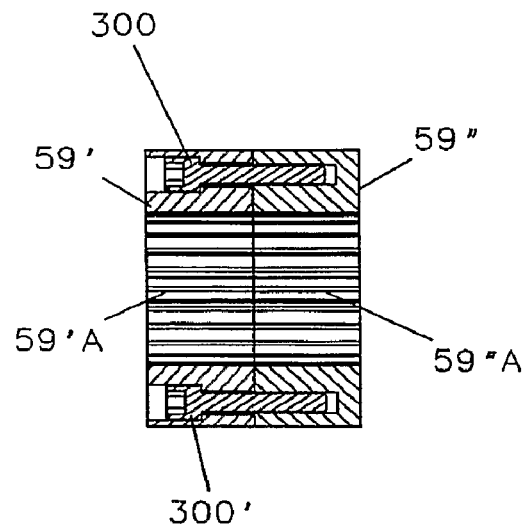
Fig. 6-C
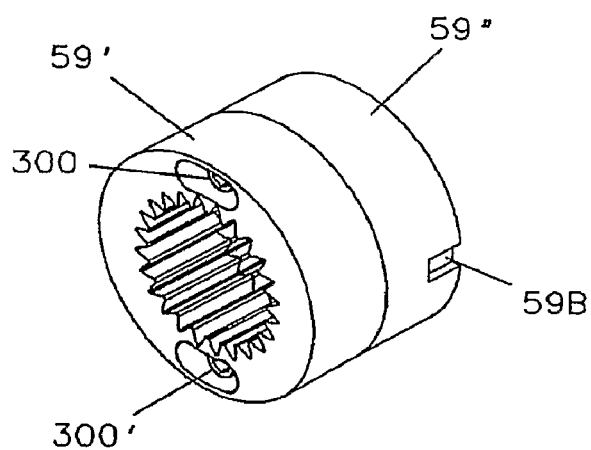
Fig.6-D

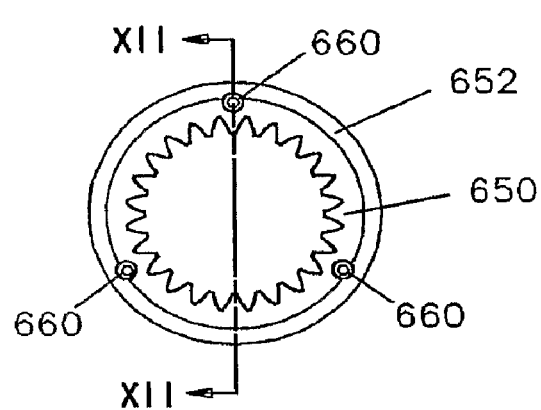
FIG.6-E
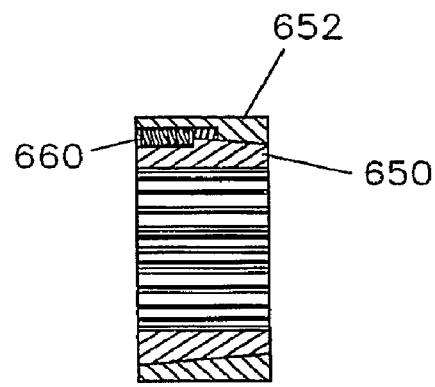
FIG.6-F
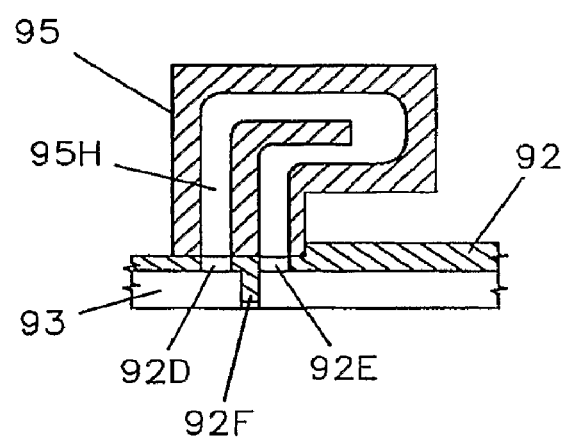
FIG.23-E

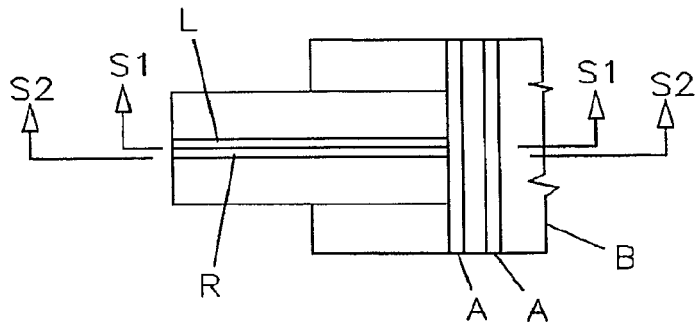
FIG.9-A
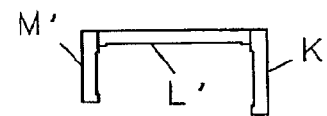
FIG.9-D
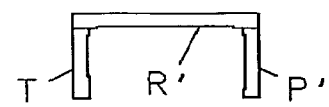
FIG.9-E
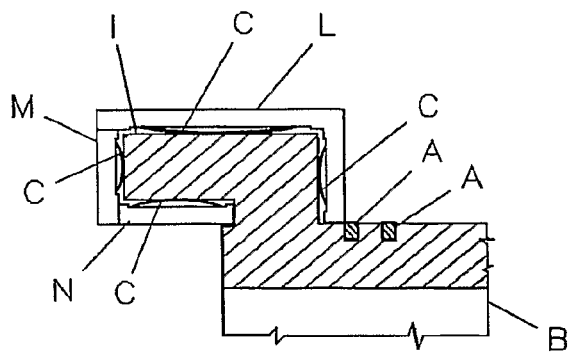
FIG.9-B
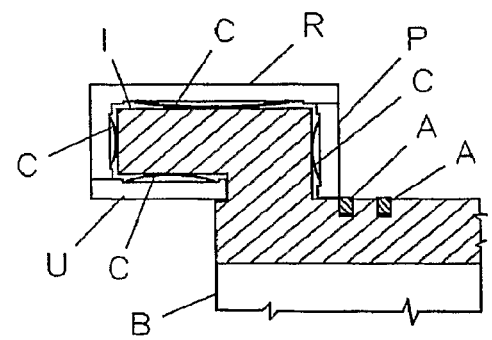
FIG.9-C
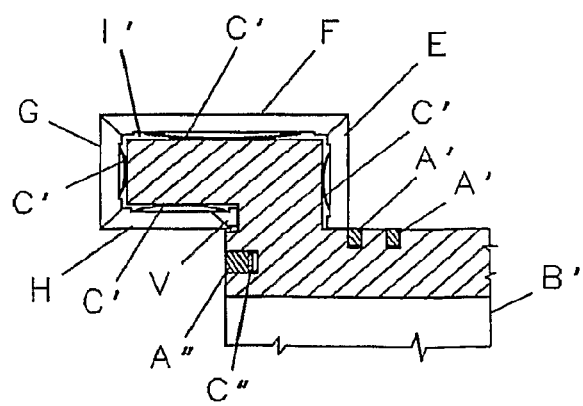
FIG.10

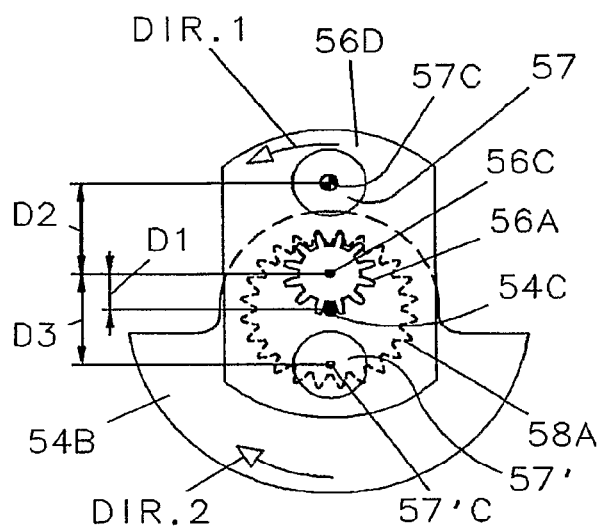
FIG. 11-A
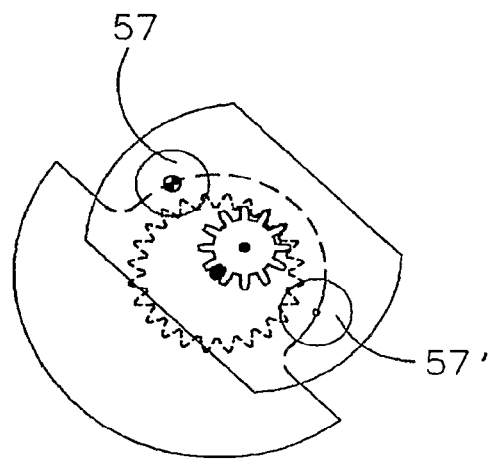
FIG. 11-B
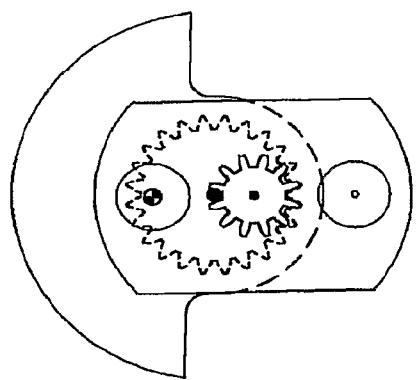
FIG. 11-C
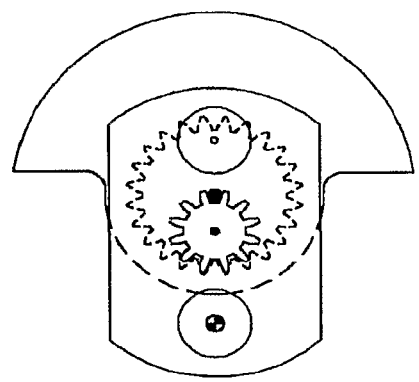
FIG. 11-D

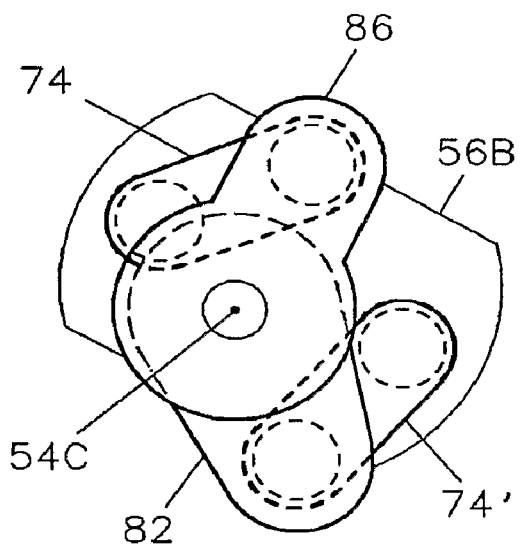
FIG.21-A
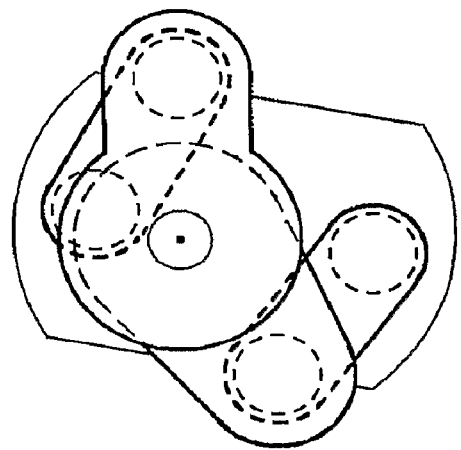
FIG.21-B
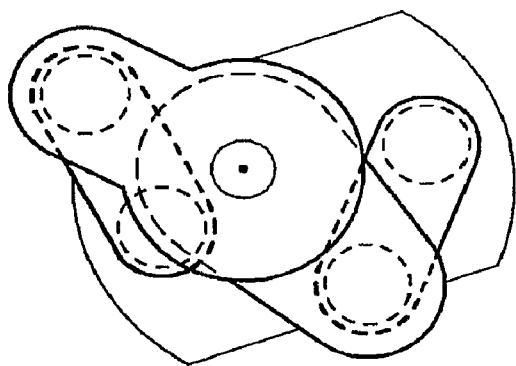
FIG.21-C
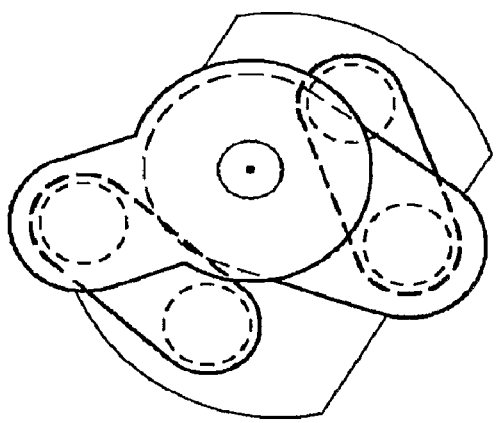
FIG.21-D

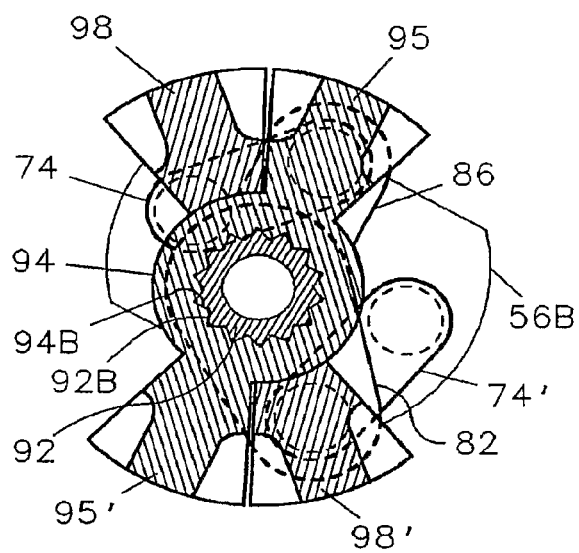
FIG.22-A
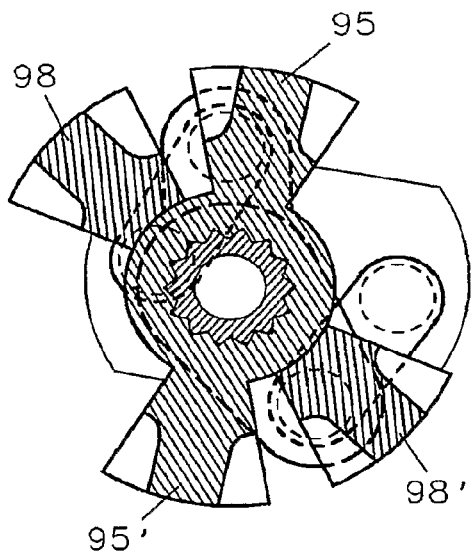
FIG.22-B
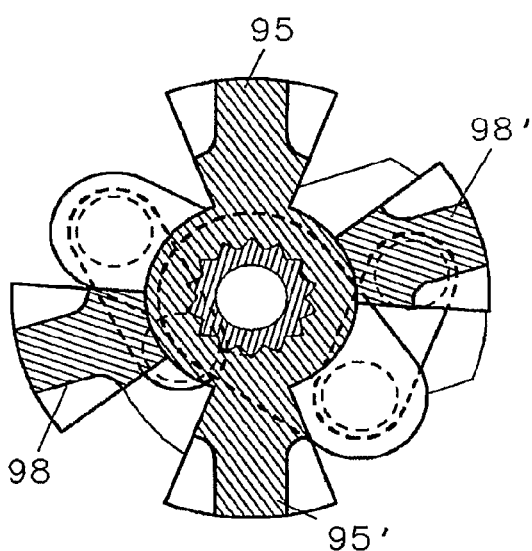
FIG.22-C
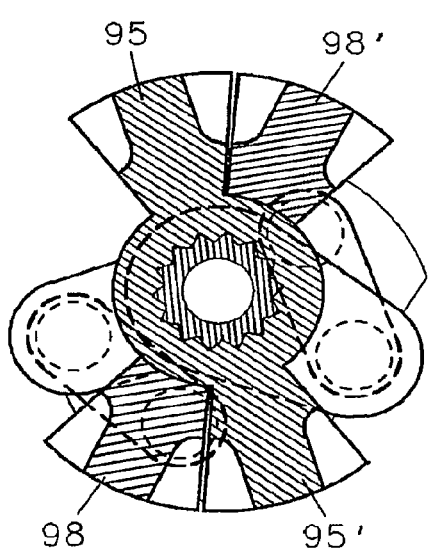
FIG.22-D

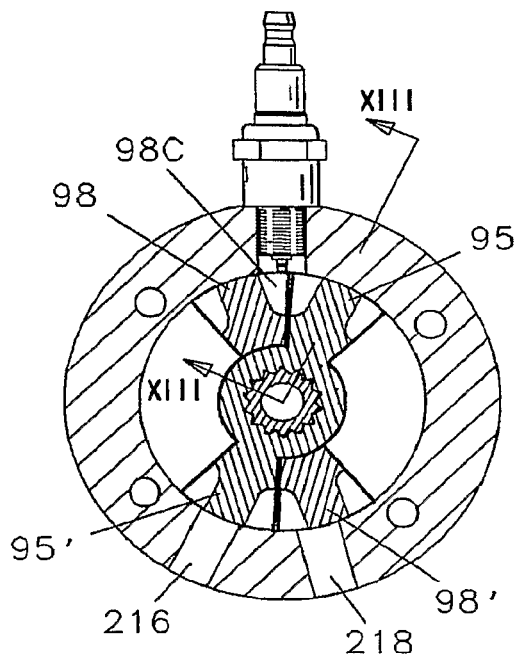
FIG.23-A
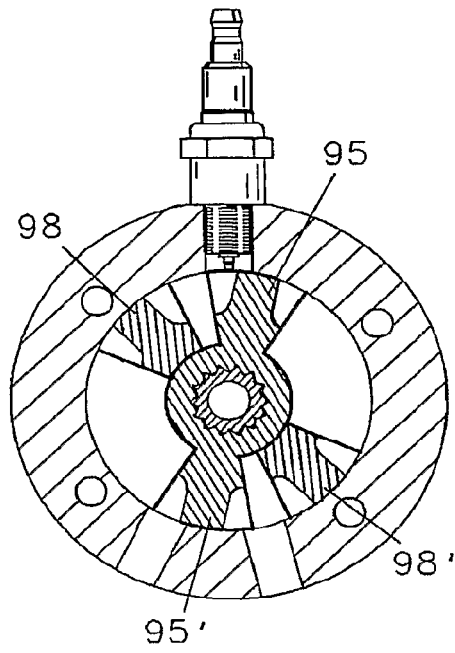
FIG.23-B
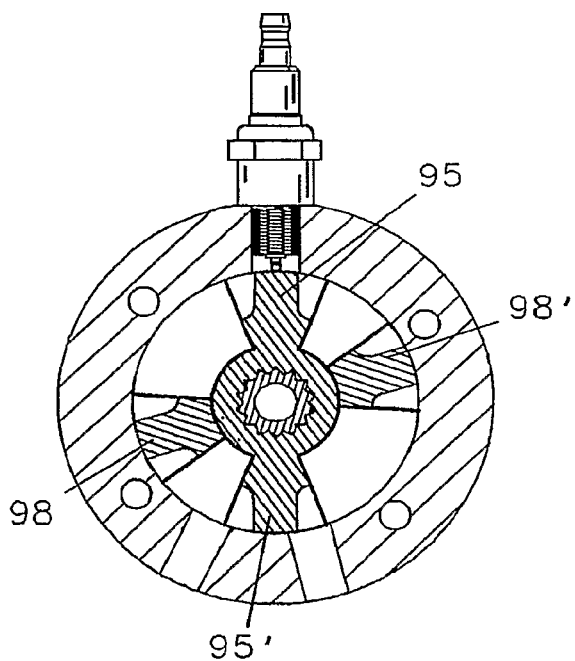
FIG.23-C
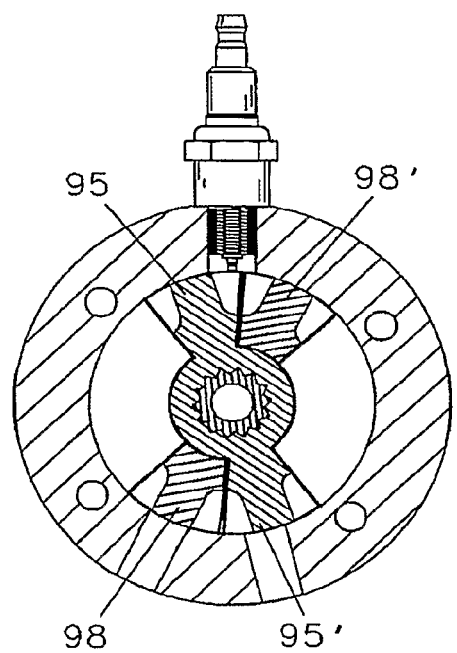
FIG.23-D

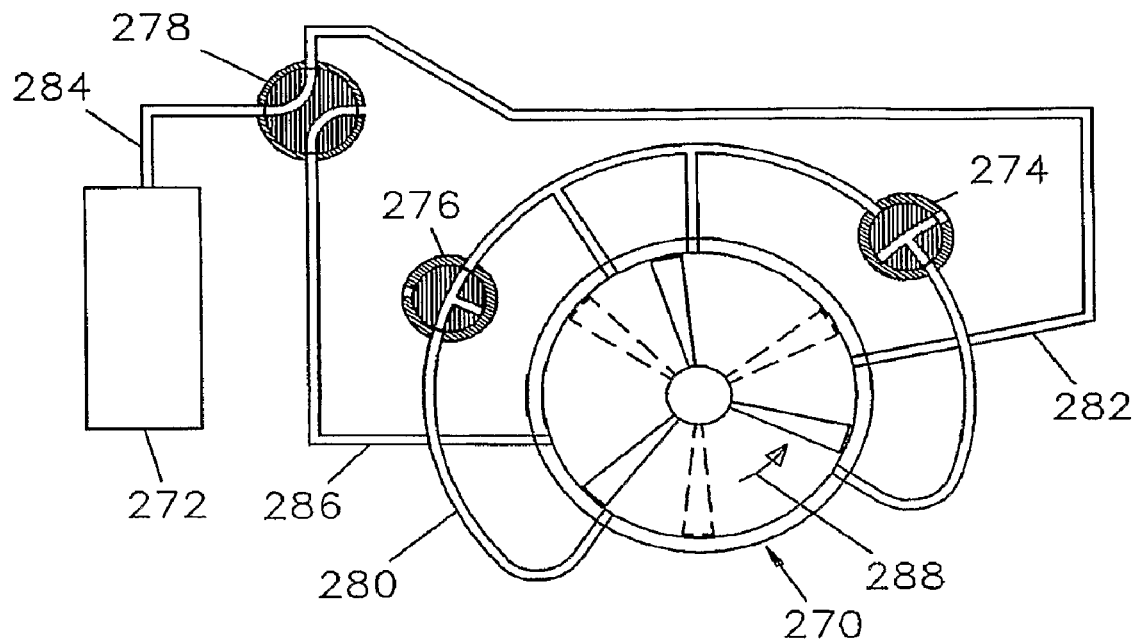
FIG. 36-A
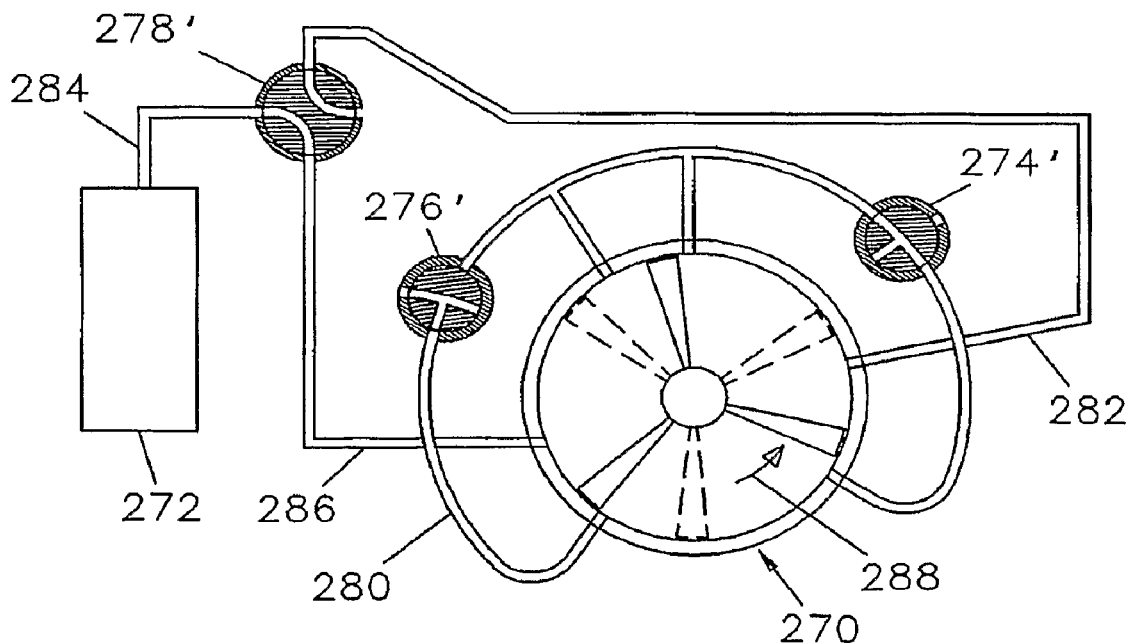
FIG. 36-B

ROTARY SCISSORS ACTION MACHINE

CROSS-REFERENCE TO RELATED APPLICATIONS

This application is a National Stage of International Application No. PCT/US2007/000842, filed Jan. 12, 2007. This application claims the priority to U.S. Provisional Application No. 60/759,301 filed on Jan. 17, 2006 entitled APPARATUS FOR CONTROLLING MOTION OF PISTONS IN ROTARY PISTON MACHINE AND METHOD FOR USING THE SAME. The disclosures of the above applications are incorporated herein by reference.

TECHNICAL FIELD

This invention relates to rotary machines such as agitators, grinders, mixers, engines, compressors, pumps, pneumatic motors, or hydraulic motors wherein a scissors action between the rotating work performing members (blades, vanes, pistons) is desired.

SUMMARY OF THE INVENTION

U.S. Pat. Nos. 1,034,451 and 6,739,307 provide examples of scissors action machines. The present invention provides an alternative to scissors action machines revealed prior.

BRIEF DESCRIPTION OF THE DRAWINGS

FIGS. 5 and 6-A are perspective views of a rotating shaft-first gear-reaction gear arrangement of the present invention;

FIGS. 6-B, 6-C, and 6-D are front elevational, sectional, and perspective views respectively of an alternative reaction gear to that shown in FIG. 6-A;

FIG. 6-E is a front view of another alternative reaction gear to that shown in FIG. 6-A;

FIG. 6-F is a sectional view taken along line XII-XII of FIG. 6-E;

FIG. 9A is a top view of an arrangement of a vane with seals;

FIG. 9-B is a cross sectional view taken along the line S1-S1 of FIG. 9-A;

FIG. 9-C is a cross sectional view taken along the line S2-S2 of FIG. 9-A;

FIGS. 9-D and 9E illustrate alternative embodiment vane seals;

FIG. 10 is a cross sectional view of a vane with an alternative embodiment arrangement of seals, taken along line S2-S2 of FIG. 9;

FIGS. 11-A to 11-D are simplified cross sectional views of the cranking mechanism, taken along line III-III of FIG. 2, with crank arms, bearings and crankcase removed, diagrammatically illustrating successive phases of the first gear and rotating shaft during 180 degrees of rotating shaft rotation;

FIGS. 21-A to 21-D are simplified cross sectional views of cranking mechanism, taken along line II-II of FIG. 2, with output shaft, bearings and crankcase removed, diagrammatically illustrating successive phases of crank arms during 180 degrees of output shaft rotation in the operation thereof;

FIGS. 22-A to 22-D are cross sectional views of vanes and cranking mechanism, taken along the line I-I of FIG. 2, with output shaft, bearings, cylinder, spark plug, cylinder wall and crankcase removed, diagrammatically illustrating successive phases of vanes and cranking mechanism during 180 degrees of output shaft rotation in the operation thereof;

FIGS. 23-A to 23-D are cross sectional views of cylinder mechanism with vanes, taken along the line I-I of FIG. 2, illustrating successive phases of vanes during 180 degrees of output shaft rotation in the operation thereof;

FIG. 23-E is a partial sectional view of an alternative embodiment vane-shaft arrangement taken along line XIII-XIII of FIG. 23-A;

FIG. 36-A is a diagram of a preferred embodiment of the six-vane two-stage compressor-motor combination, with valves set for two-stage motor operation;

FIG. 36-B is a diagram of a preferred embodiment of the six-vane two-stage compressor-motor combination, with valves set for two-stage compressor operation;

DETAILED DESCRIPTION OF THE DRAWINGS

Figure 1:
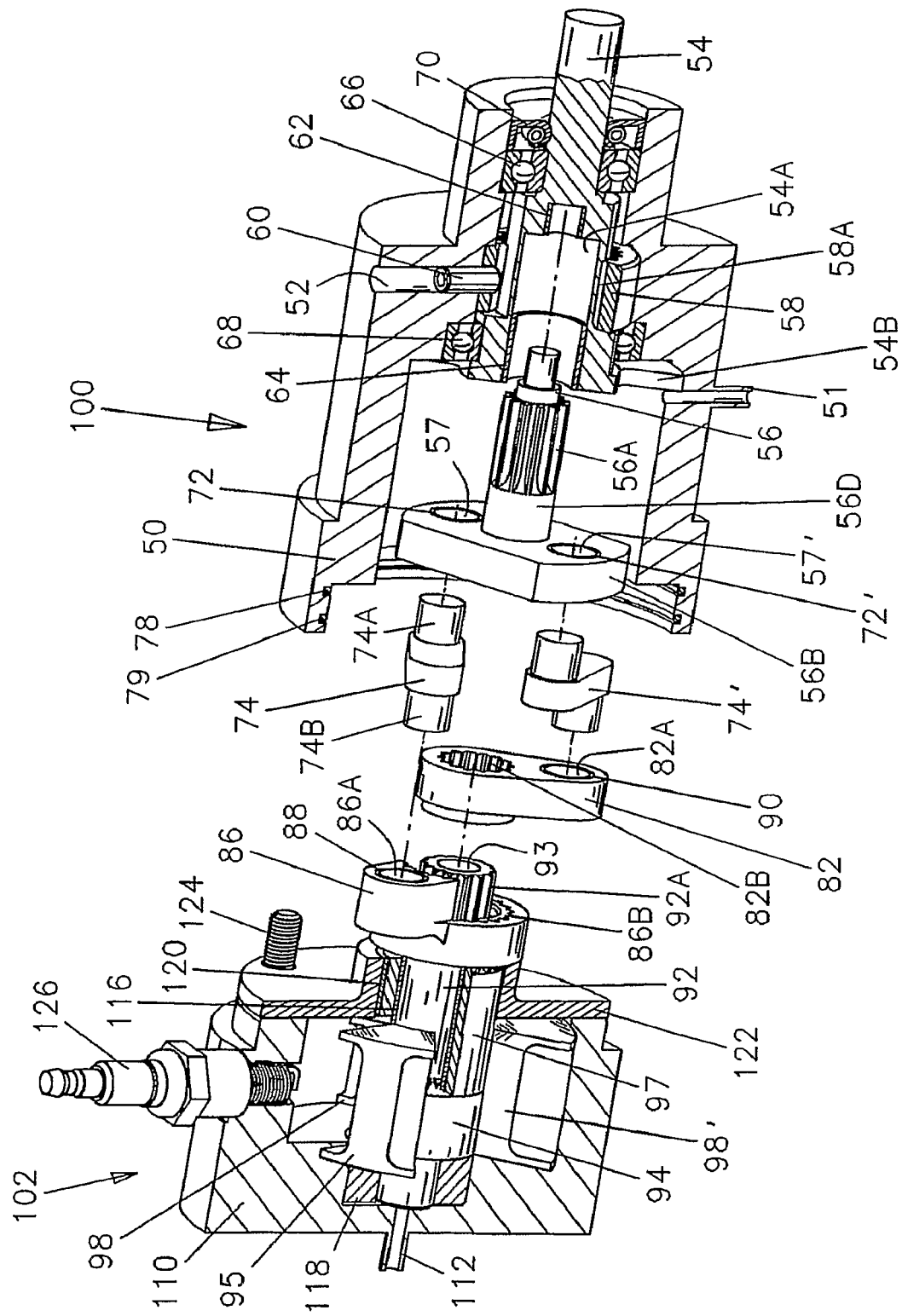
FIG. 1 is a partial cut away and partially exploded view of a preferred embodiment of a four-vane engine application of the present invention.

Referring to FIGS. 1-3, 5 and 6A a cranking mechanism 100 of a rotary scissors action machine of the present invention includes a first gear or pinion 56 that is eccentrically mounted in a cavity or recess 54A of a rotating or output shaft 54. The pinion 56 is mounted in an anti-friction bearing 62 and in a bearing 64. The output shaft 54 is rotatably contained in a crankcase 50, wherein it is mounted in an anti-friction bearing 66 and in a bearing 68. Pinion 56 has a stem 56D with teeth that form an external gear 56A. The teeth of gear 56A mesh with internal gear teeth 58A of a reaction or internal gear 58 through an exposing window 54D of the recess 54A of the output shaft 54. Gear 58 is fixedly mounted in crankcase 50, wherein a dowel pin 60 indexes the gear. The dowel pin is retained in a hole 52 of the crankcase.

In another embodiment, as shown in FIGS. 6-B, 6-C, and 6-D, the internal gear comprises two adjustably connected internal gears: a gear 59', and a gear 59", joined by a screw 300, and by a screw 300'. Gear 59' has internal teeth 59'A. Gear 59" has internal teeth 59"A. Gear 59" has a recess 59B that allows the gear to be angularly adjusted or indexed with the crankcase (not shown). When the screws are loose, gear 59' can be rotated to eliminate backlash with the pinion gear (not shown). After backlash is eliminated, the screws are fastened.

As shown in FIG. 6-E and in FIG. 6-F, another embodiment reaction gear has an inner ring member 650 adjustably connected into an outer ring member 652. An outer surface of the inner ring member 650 is conically tapered. An inner surface of the outer ring member 652 is also tapered. Set screws 660 draw the inner ring member 650 into the tapered outer ring member 652 causing the inner ring member 650 to collapse thus reducing possible backlash between inner member 650 and the first gear (not shown in FIGS. 6-E and 6-F) that meshes with inner ring member 650. In another embodiment (not shown), inner ring member 650 has a flange, and screws have heads.

Teeth of the first gear and reaction gear can be made of any suitable material and profile, such as straight, helical, double helical with both left and right helix to counter axial forces. Teeth of the first gear and teeth of the reaction gear can be tapered through a continuous teeth profile shifting toward the gears centerline to alleviate backlash between said first and reaction gear. Other teeth profiles and types of teeth can also be utilized.

A radial lip oil seal 70 seals the shaft 54. In a preferred embodiment oil seal 70 is pressed into crankcase 50. The shaft 54 has a counterweight 54B for balancing of forces.

One end of pinion 56 forms a pinion disk 56B. The disk 56B has a pivot aperture or hole 57 and a pivot aperture or hole 57'. An anti-friction bearing 72 is contained in the hole 57, and an anti-friction bearing 72' is contained in the hole 57'. The pinion disk 56B interacts with crank arms 86, 82 of the cylinder mechanism 102 via two respective pivotally connected connecting rods: a connecting rod 74 and a connecting rod 74'. At one end rod 74 incorporates a pin 74A, which pin is pivotally inserted within bearing 72, whereas the other end of rod 74 has a pin 74B that is pivotally inserted within a pivot aperture of bearing 88 of crank arm 86. In the same manner a connecting rod 74' links hole 57' located in the pinion disk with hole 82A of the crank arm 82. The crank arms in the embodiment shown in FIGS. 1-3 pivot in a common transverse plane. In like manner, the connecting rods pivot in a common transverse plane.

Figure 4:
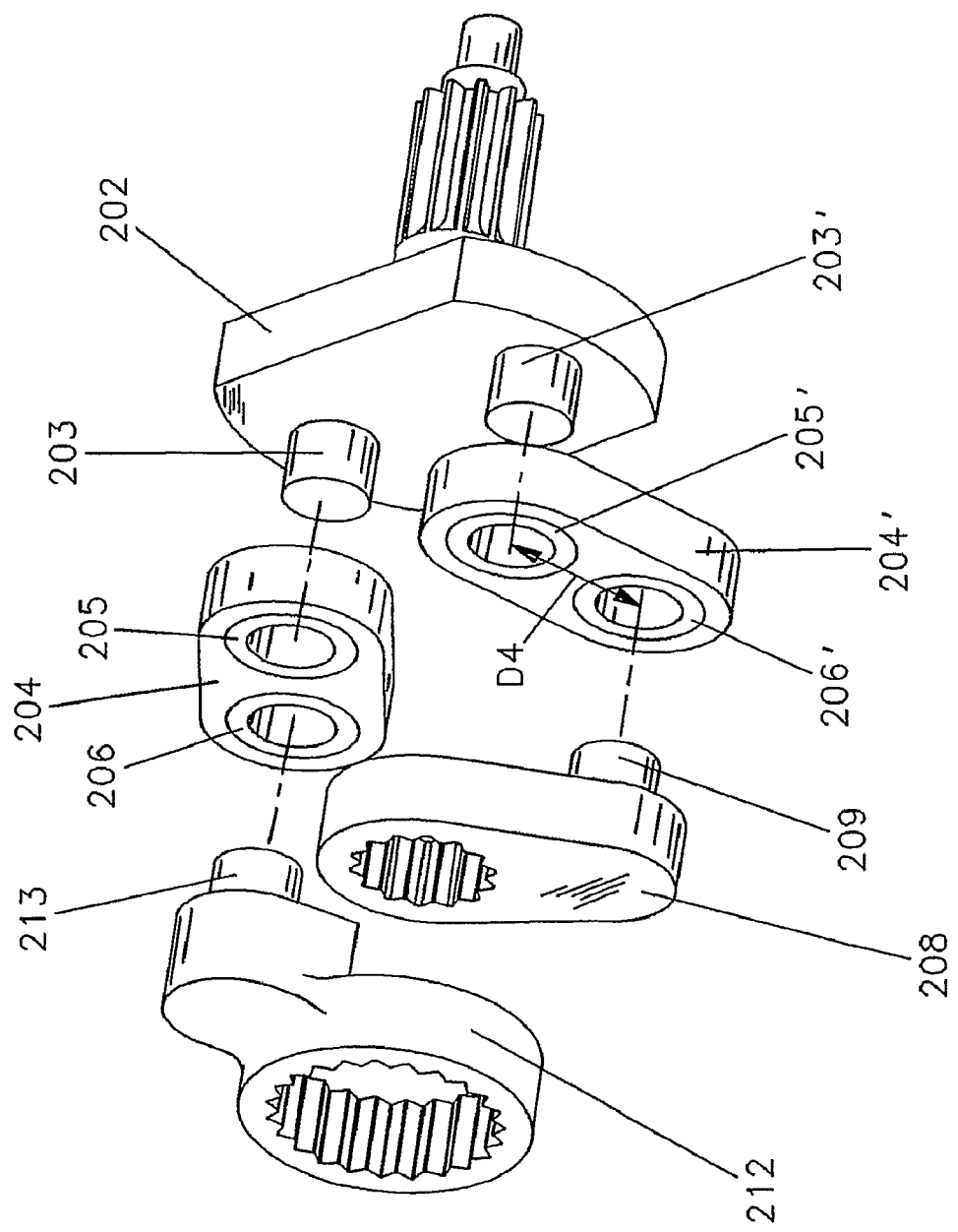
FIG. 4 is an exploded view of a portion of an alternative embodiment cranking mechanism to that shown in FIG. 1.

In another embodiment, as shown in FIG. 4, a pinion disk 202 incorporates a pin 203 and a pin 203', whereas a connecting rod 204 contains a bearing 205 at one end and a bearing 206 at the other end. Similarly, a connecting rod 204' of this embodiment contains a bearing 205' and a bearing 206'. A distance between the bearings is designated as D4, and is referred to as length of a connecting rod. A crank arm 208 has a pin 209. A crank arm 212 has a pin 213. Pin 203 pivotally mounts inside bearing 205, whereas pin 213 pivotally mounts inside bearing 206. Thus, connecting rod 204 links disk 202 with arm 212. Likewise, pin 203' pivotally mounts inside bearing 205', whereas pin 209 pivotally mounts inside bearing 206'. Thus, connecting rod 204' links disk 202 with arm 208.

Figure 2:
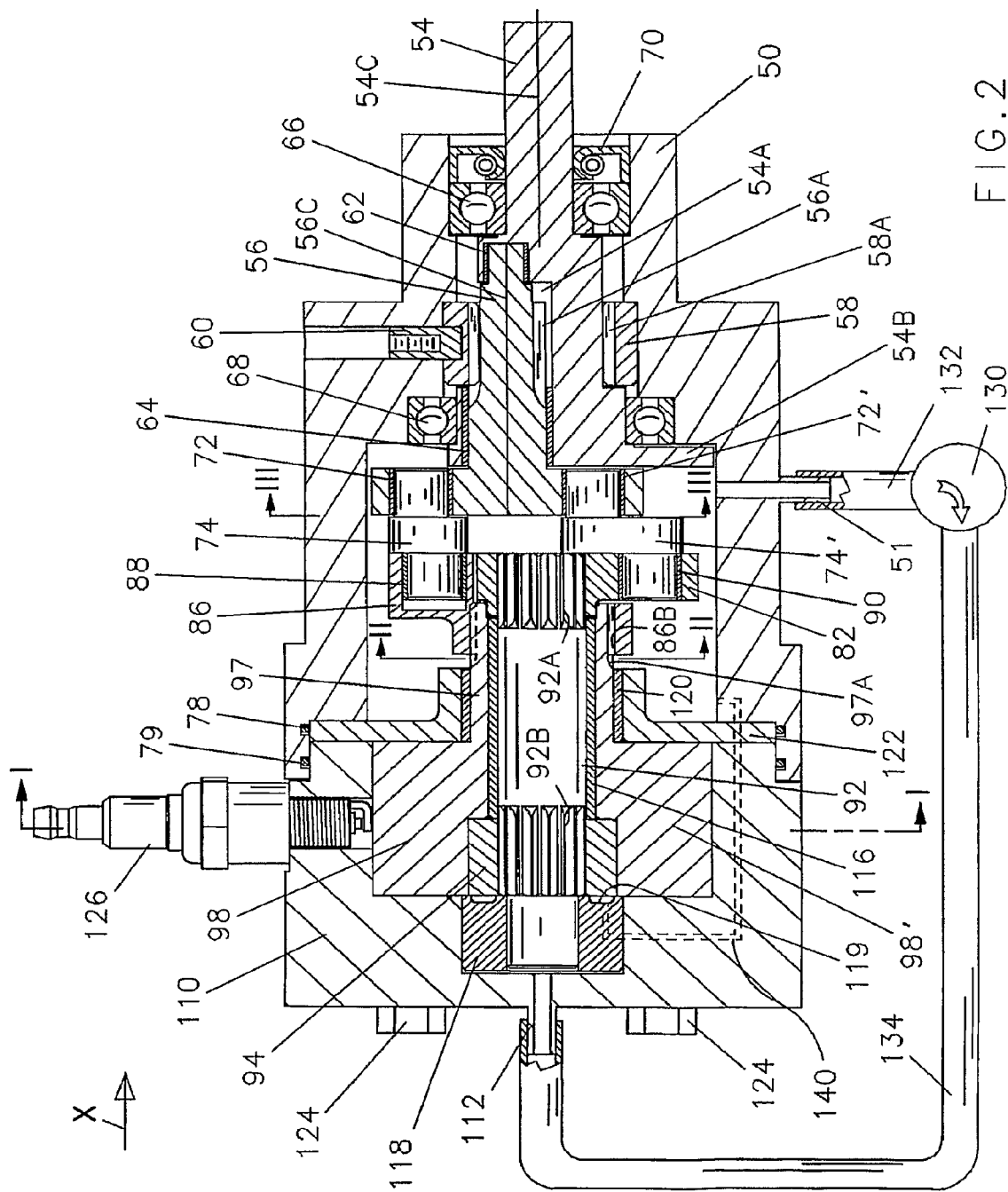
FIG. 2 is a partial sectional view of the engine shown in FIG. 1.
Figure 12:
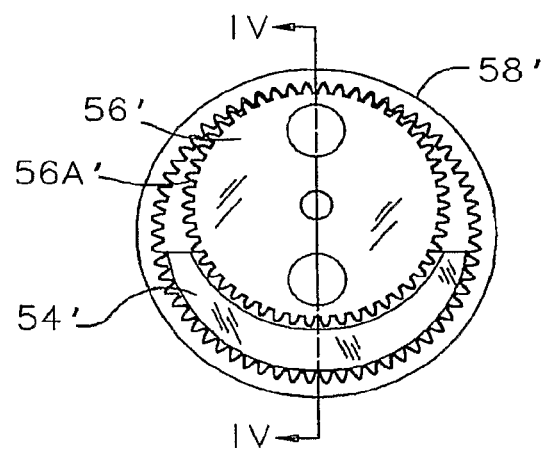
FIG. 12 is a front view of an alternative embodiment of rotating shaft-first gear-reaction gear arrangement.
Figure 13:
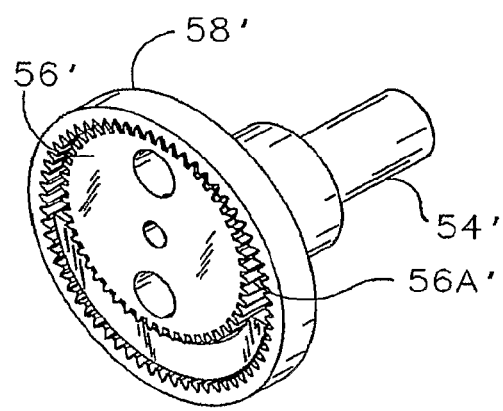
FIG. 13 is a perspective view of the rotating shaft-first gear-reaction gear arrangement of FIG. 12.
Figure 14:
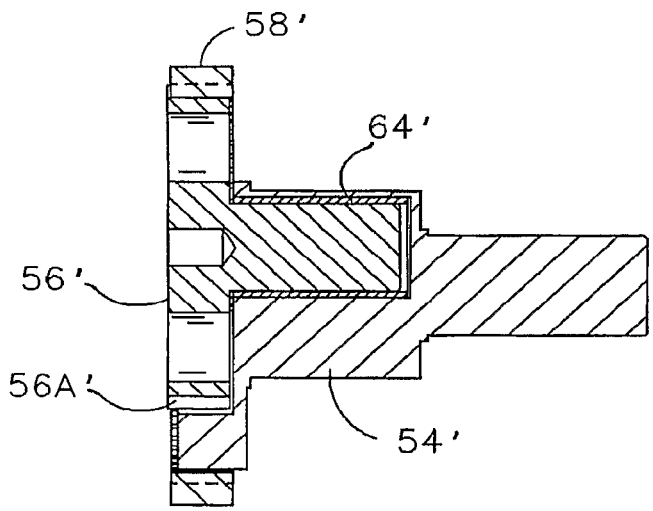
FIG. 14 is a view taken along line IV-IV of FIG. 12.
Figure 15:
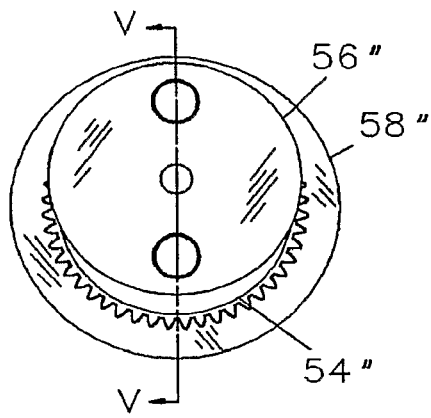
FIG. 15 is a front view of an alternative embodiment rotating shaft-first gear-reaction gear arrangement.
Figure 16:
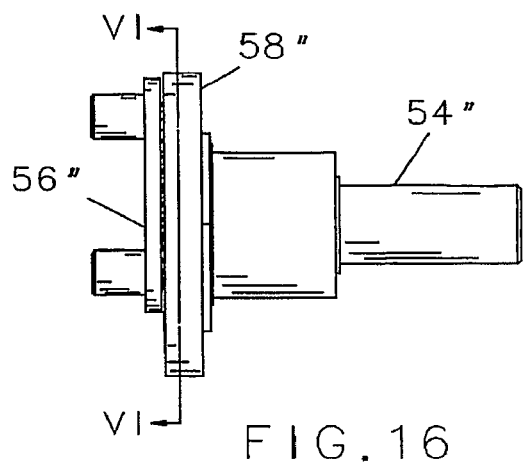
FIG. 16 is a side view of the rotating shaft-first gear-reaction gear arrangement of FIG. 15.
Figure 17:
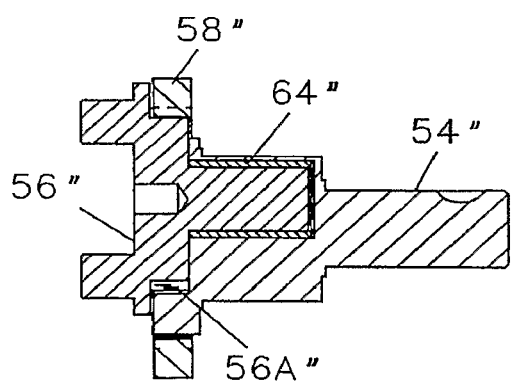
FIG. 17 is a cross sectional view of the rotating shaft-first gear-reaction gear arrangement, taken along line V-V of FIG. 15.
Figure 18:
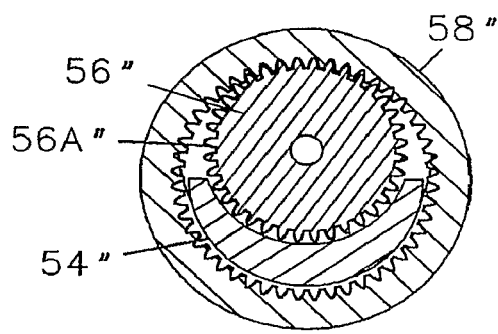
FIG. 18 is a view taken along line VI-VI of FIG. 16.
Figure 19:
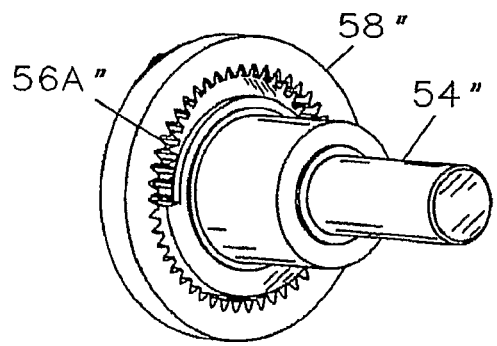
FIG. 19 is a perspective rear view of the rotating shaft-first gear-reaction gear arrangement of FIG. 15.
Figure 20:
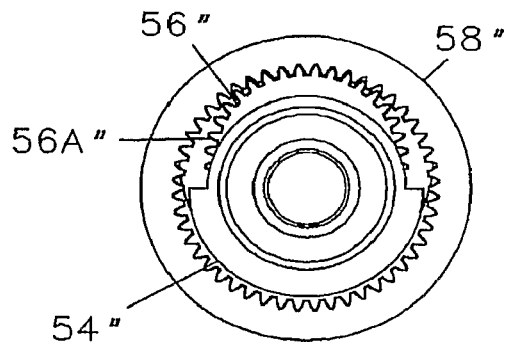
FIG. 20 is a rear view of the rotating shaft-first gear-reaction gear arrangement of FIG. 15.

Lubrication and partial cooling is provided by an oil pump 130 that pumps oil through oil lines 132 and 134 to the coaxial shafts and to the vanes through an oil gallery 93 located inside said coaxial shafts and vanes. Oil line 132 connects with crankcase 50 via hollow stem 51, whereas oil line 134 connects with cylinder mechanism 102 via hollow stem 112. In yet another embodiment (not shown) oil lines are integral part of crankcase and cylinder, as it is a common engineering practice. To prevent oil leakage, an o-ring 78 and an o-ring 79 are employed as shown in FIG. 2. A recess 119 in bearing 118 collects excess oil from lubrication of bearing 118. A return oil gallery 140 drains excess oil from recess 119 into crankcase 50. In another embodiment, (not shown) oil is pumped by meshing teeth of the internal gear 58 and external gear 56A. In yet another embodiment (not shown) oil is pumped by a centrifugal pump, preferably integrated with the main shaft 54. In yet another embodiment (not shown) oil is pumped by a traditional gear, gerotor, or piston oil pump In another embodiment of cranking mechanism, as shown in FIGS. 12, 13, and 14, pinion 56', has external gear 56A' formed on a disk end. A stem end of the pinion is rotatably contained in an eccentrically located recess of an output shaft 54', wherein it is mounted in an anti-friction bearing 64'. Gear 56A' meshes with an internal gear 58'. Gear 58' is fixedly mounted in a housing (not shown).

In yet another embodiment of cranking mechanism, as shown in FIGS. 15, 16, 17, 18, 19, and 20, a pinion 56" has an external gear 56A" that is formed on its disk larger diameter. The other portion of the pinion is rotatably contained in an eccentrically located recess of an output shaft 54", wherein it is mounted in an anti-friction bearing 64". Gear 56A" meshes with an internal gear 58". Gear 58" is fixedly mounted in a housing (not shown).

Figure 3:
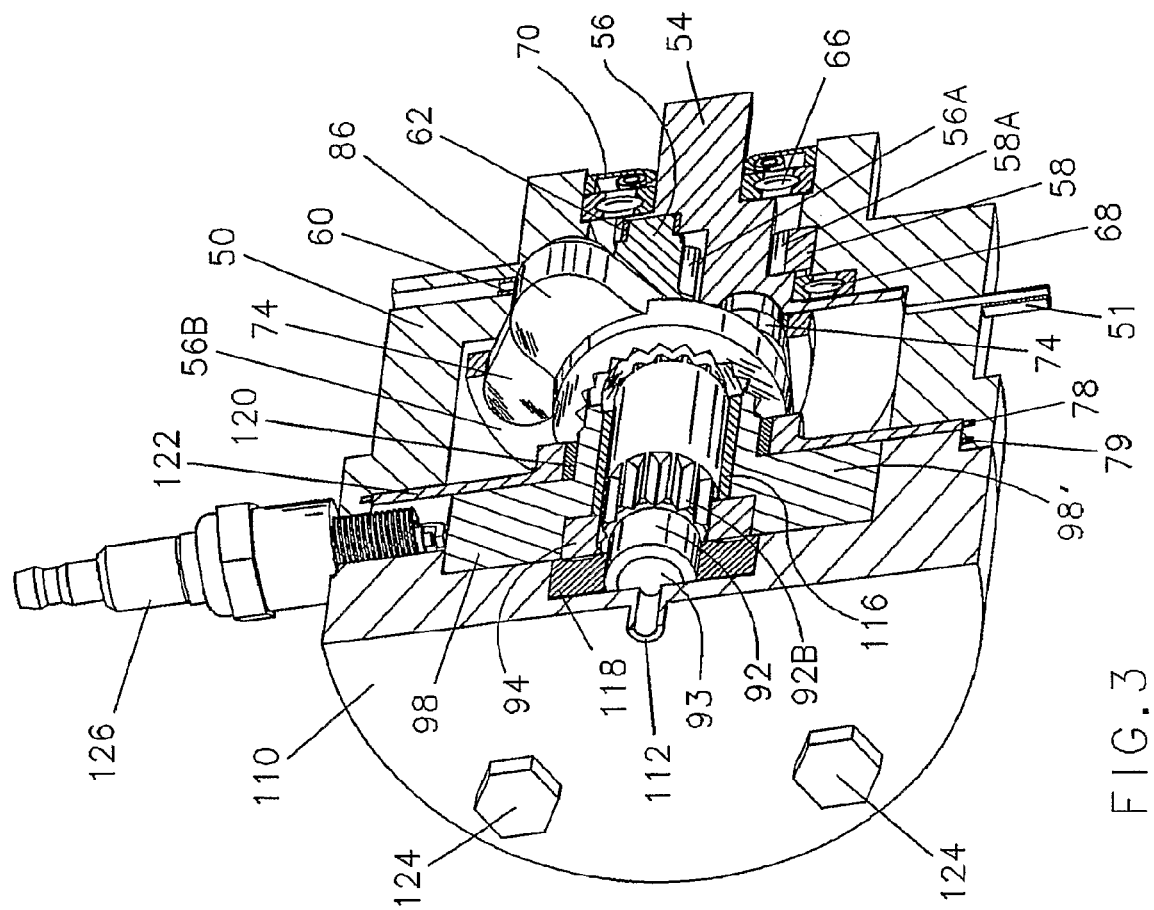
FIG. 3 is a perspective, partially sectioned view of the engine shown in FIG. 1.

In FIGS. 1-3, the cranking mechanism 100 of the present invention is utilized with a four-vane engine or compressor with the cylinder mechanism 102. Two forward work performing members or vanes (sometimes referred to as pistons) of the four-vane engine are shown as 98 and 98' being diagonally opposed and are an integral connected part of an outer coaxial shaft 97. The vanes bifurcate a control volume of the cylinder. Two other rearward juxtaposing vanes (best shown in FIG. 22-A) are shown as 95 and 95' being diagonally opposed and are an integral connected part of a tube 94. Tube 94 has internal splines 94B as shown in FIG. 22-A. An inner coaxial shaft 92 (FIG. 22-A, and FIGS. 2, and 3) has external splines 92B formed on a partial length of its outside diameter, as best shown on FIG. 2. Splines 94B of tube 94 are pressed over external splines 92B of inner shaft 92. As a result, vanes 98 and 98' are driven by shaft 97, and vanes 95 and 95' are driven by shaft 92.

As shown in FIGS. 1 and 2, shaft 92 has external splines 92A formed on one end of the shaft. In addition, shaft 97 has splines 97A formed on its end. As shown in FIGS. 1 and 2, a crank arm 86 has internal splines shown as 86B that are pressed over external splines 97A. Likewise, a crank arm 82 has internal splines 82B that are pressed over external splines 92A. Arm 82 has a pivot aperture or hole 82A which contains an anti-friction bearing 90. Arm 86 has a pivot aperture or hole 86A which contains an anti-friction bearing 88.

Shaft 92 is rotatably contained in shaft 97, wherein it is mounted in an anti-friction bearing 116. One end of shaft 92 is rotatably contained in a bearing 118. Shaft 97 is rotatably mounted in a bearing 120.

Figure 7:
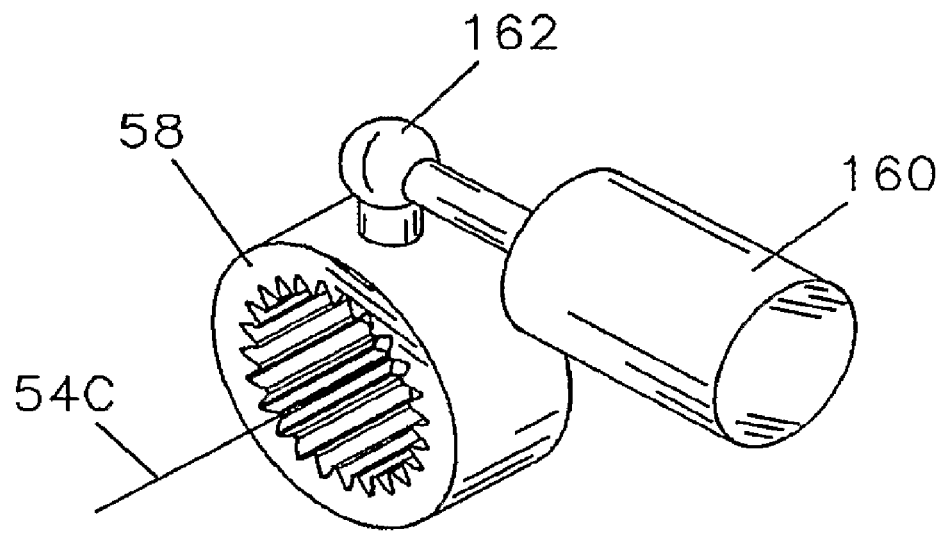
FIGS. 7 and 8 are perspective views of alternative embodiments providing indexing of the reaction gear.
Figure 8:
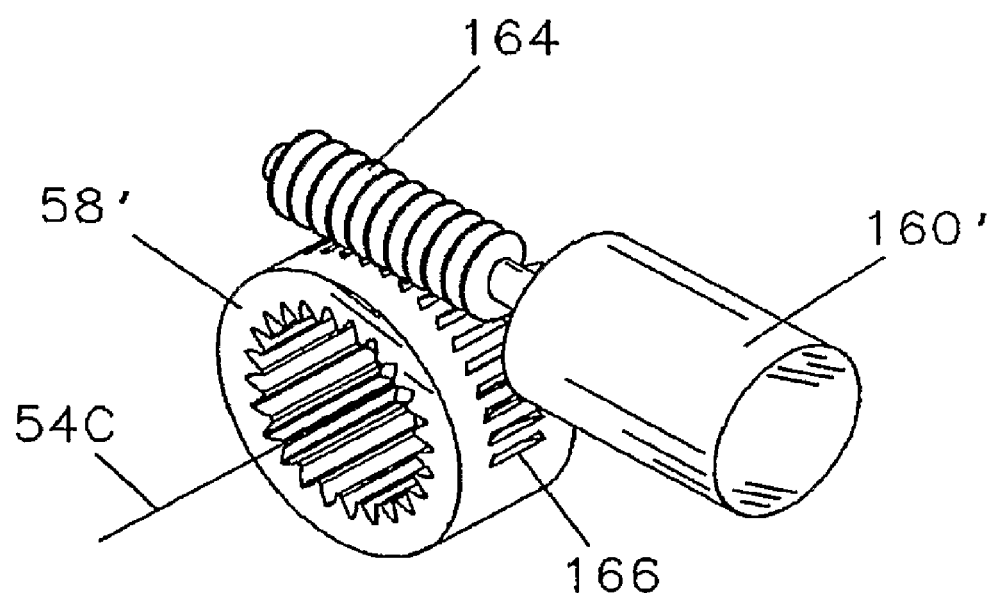

FIG. 7 shows an alternative embodiment for indexing and fastening of internal gear 58 during operation. A linear servo mechanism 160, is connected to gear 58 through a join 162, thus servo 160 pivots gear 58 around center axis 54C. Servo 160 is commonly attached to crankcase 50 (not shown). In yet another embodiment, as shown in FIG. 8, a rotary servo mechanism 160' is commonly connected to an internal gear 58' via a worm gear arrangement that comprises a worm 164 and a worm gear 166 formed on the periphery of internal gear 58'. Thus servo 160' pivots gear 58' around center axis 54C. Servo 160' is commonly attached to crankcase 50 (not shown). Pivoting of gear 58 or gear 58' around axis 54C changes timing of intake and exhaust, as well as changes phases (circumferential position of the vanes maximum and minimum velocity) of vanes 95, 95', 98, and 98'.

Cylinder arrangement 102 includes a cylinder 110, a cylinder wall 122, a spark plug 126, bolts 124 that fasten the cylinder to cranking mechanism 100. The cylinder arrangement also comprises the vanes and bushings. Bearing 118, 116, and bearing 120 locate the vanes radially, whereas cylinder 110 and cylinder wall 122 contain the vanes axially. The cylinder is preferably made of aluminum, but other materials such as steel may be used. In another embodiment (not shown), the cylinder is coated with ceramics. In yet another embodiment (not shown), the cylinder is made of aluminum and has a steel liner—a standard engineering practice. In another embodiment (not shown), for the ease of manufacturing cylinder 110 includes two separate parts commonly joint together: a cylindrical portion and a front wall. In yet another embodiment (not shown), to help balance the forces generated by gas pressure, tube 94 is extended into the cavity in cylinder 110 that houses bearing 118.

When the present invention operates as a compression ignition engine, spark plug 126 is replaced by fuel injection means (not shown), and the cylinder incorporates a glow plug (not shown), which is a common engineering practice. In a spark ignited version, cylinder mechanism 102 may incorporate gasoline direct fuel injection means (not shown), which is also a common engineering practice. The present invention can operate as a two or four cycle internal combustion engine.

The anti-friction bearings can be of any type suitable for a particular application, such as: bronze bearings, Teflon impregnated bushings, ceramic bearings, ball bearings, rolling bearings, needle roller cage assemblies. In another embodiment (not shown) several bearings of various sizes replace one long antifriction bearing, which is a common engineering practice. In yet another embodiment (not shown), multiple bearings of different types are used in place of one bearing, which is also a common engineering practice. In particular, a thrust bearing in combination with a radial bearing substitutes any of the bearings.

In another embodiment (not shown), to maintain a predetermined and constant axial distance between the vanes, bearing 116 is of a rolling type with its inner and outer raceways rigidly attached to shaft 92 and to shaft 97. To maintain a predetermined and constant axial distance between the vanes and the cylinder walls of that alternative embodiment, bearing 118 is also of a rolling type with its inner raceway rigidly attached either to shaft 92, or to extended tube 94 (not shown). An outer raceway of bearing 118 in that embodiment is rigidly attached to cylinder 110. A common way of rigidly attaching rolling bearings is press fitting them to a shaft or inside a sleeve, or to both. Preferably, the bearings are press fitted. Other common methods may also be used.

In yet another embodiment (not shown), to eliminate contact between the cylinder walls and the vanes a wave spring or a spring washer (not shown) is installed between crank arm 86 and cylinder wall 122. Bearing 118 in this embodiment is of a single or two-bearing combination (not shown), capable of carrying both radial and axial loads. Optionally, a wave spring or a wave washer is installed between crank arm 82 and crank arm 86 (not shown). This is a common engineering practice therefore, it is not shown or described in details.

In yet another embodiment (not shown), a compressor, motor, or a compressor-motor combination, has eight vanes. Four vanes being attached to one coaxial shaft, and four vanes attached to another coaxial shaft. The invention does not limit the number of vanes. The number of vanes of the present invention can be uneven.

In another embodiment (not shown), the control volume is between the inner and outer coaxial shafts. The vanes are attached to the inner and to the outer coaxial shafts with the tip of one set of vanes being directed radially inward and the tip of the other set of vanes being directed radially outward. In yet another embodiment, the vanes are cast of light material such as aluminum around the inner and outer coaxial shafts. In yet another embodiment (not shown), the vanes may be integral part of a tube, which tube is pressed over the inner and outer coaxial shafts. To lower the inertia and mass of the vanes, the vanes may be hollow inside, which is a common engineering practice.

The outer coaxial shaft 97 and tube 94 seal against each other on their contacting surfaces. To improve sealing, seals (not shown) similar to those commonly used in the Wankel and other rotary engines may be used to seal all vane surfaces. In particular, the following surfaces can be sealed with Wankel sealing system: the periphery of vanes, faces of the vanes, and the contacting surfaces between vanes (not shown).

FIGS. 9-A, 9-B, and 9-C show an arrangement of seals. The seals are arranged in paired segments to reduce leakage coming through spaces between joins between sealing segments. Segments L, M, N are arranged in one row. Segments P, R, U are arranged in a second row. The segments are being pushed against the surfaces they seal by leaf springs C. A coaxial shaft B is axially sealed by piston rings A. The segments and springs sit in a recess I of the vane. In another embodiment (not shown), piston rings A are positioned farther away from vane faces.

In yet another embodiment, one row as shown in FIG. 9-D comprises sealing segments K, L', M', and the second row shown in FIG. 9-E comprises segment P', R', T.

In yet another embodiment, as shown in FIG. 10, only one row of sealing segments shown as E, F, G, H, and V is used. The ends of segments are cut at an angle (as shown), to eliminate gaps caused by sealing segments being shorter then the space in cylinder they are sealing. The segments are being pushed against the surfaces they seal by leaf springs C'. All the segments and springs are placed in recess I' of the vane. A coaxial shaft B' is radially sealed by piston rings A', and axially sealed by a piston ring A". The piston ring A" is being axially pushed by a wave spring C".

Common piston and oil rings may be used to seal shaft 92 and shaft 97 against cylinder and cylinder walls. Also common packing, oil seals, gas seals, wear rings, and wear plates may be used to seal the shafts of the mechanism. The seals may be placed in recesses or in grooves on either the shafts or cylinder walls (not shown). Those are sealing techniques well known in prior art, therefore they are not described in greater detail. FIGS. 11-A to 11-D show successive phases during 180 degrees of output shaft 54 rotation in a direction shown as DIR. 2. Containment of pinion 56 inside output shaft 54, as well as meshing of teeth 58A of the reaction gear 58, with teeth 56A that are part of pinion 56 force pinion 56 to execute two rotary motions simultaneously: a center of pinion 56C (also known as axis of pinion 56) rotates with shaft 54 around the center 54C (also known as axis of shaft 54) in direction DIR. 2, whereas pinion 56 also rotates around center 56C in a direction shown as DIR. 1, that is opposite to the output shaft 54 direction of rotation. In a preferred embodiment, the ratio between number of teeth 58A to number of teeth 56A is 2:1. In a four-vane mechanism this results in pinion 56 rotation around its axis 56C by the same angle of rotation as output shaft 54 about axis 54C but in the opposite direction. Thus, when shaft 54 completes a full 360 degrees of rotation about its centerline 54C, shaft 56 rotates with shaft 54 this same angle about centerline 54C, while executing a 360 degrees of rotation about its own centerline 56C but in the opposite direction.

A general formula for a preferred embodiment of a gear ratio between external and internal gears of an N-work performing member (or vane) mechanism of the present invention is as follows:

$$0.5N/(0.5N-1)$$

Where N is the total number of vanes of the mechanism, (total number of vanes attached to both coaxial shafts). If "n" represents number of vanes on just one coaxial shaft, the gear ratio between external and internal gears in a preferred embodiment is:

$$n/(n-1)$$

At the above noted preferred embodiment, the vanes angular or circumferential position of maximum and minimum angular velocities of the vanes is constant regardless of the angular velocity of the rotating shaft.

As depicted in FIGS. 21-A to 21-D, pinion disk 56B is linked to crank arms 82 and 86 via connecting rods 74 and 74', thus the combined motion of the pinion disk 56B around two centerlines results in a non-uniform motion of the crank arms. While both crank arms revolve around common center 54C, they do not rotate with this same angular speed. Since both crank arms are directly connected to vanes 95, 95' and 98, 98', the angular motion of the vanes is identical to the angular motion of the respective crank arms that they are connected to, as diagrammatically shown in FIGS. 22-A to 22-D. As shown in FIGS. 23-A to 23-D, this non-uniform motion causes the vanes to have a cyclic non-constant angle between them commonly referred to as scissors motion. The scissors action of the vanes translates into a changing volume between vanes as the vanes rotate. During one revolution of the output shaft 54, the vanes execute four suction-compression-expansion cycles that can be utilized as combustion engine cycles, or the vanes execute eight suction-compression cycles that can be utilized as compressor or a pump, or a fluid motor cycles. The vanes 98, 95 as best shown in FIGS. 23-A have an external cavity 98C. When the vanes are closely adjacent one another the cavities 98C form a reduced volume combustion chamber.

Figure 24:
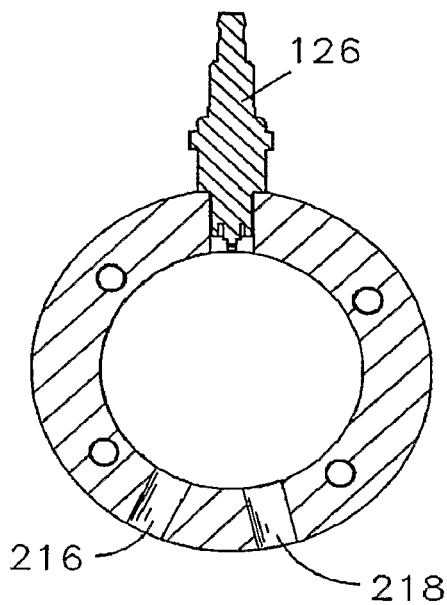
FIG. 24 is a cross sectional view of cylinder with vanes removed, taken along the line I-I of FIG. 2, illustrating intake and exhaust arrangements of a combustion engine application of this invention.
Figure 25:
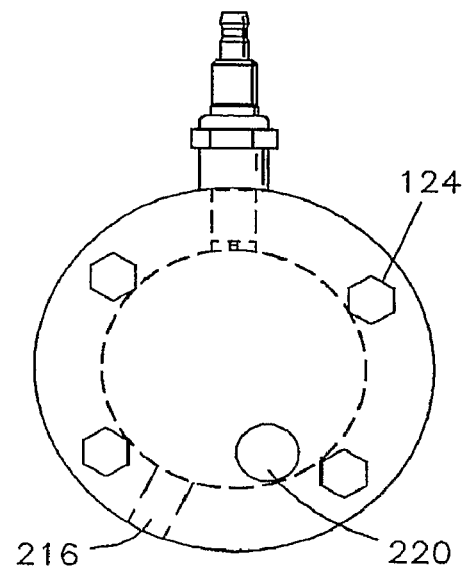
FIGS. 25-27 are views in direction X of FIG. 2, illustrating alternative intake and exhaust arrangements of a combustion engine application of this invention.
Figure 26:
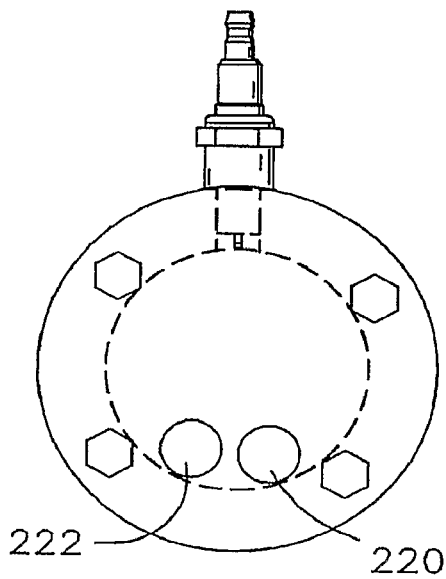
Figure 27:
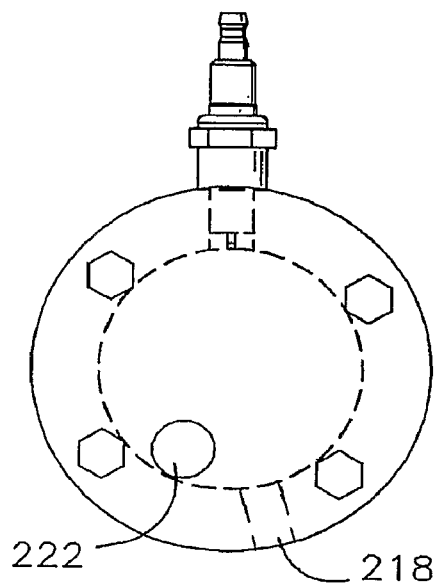
Figure 28:
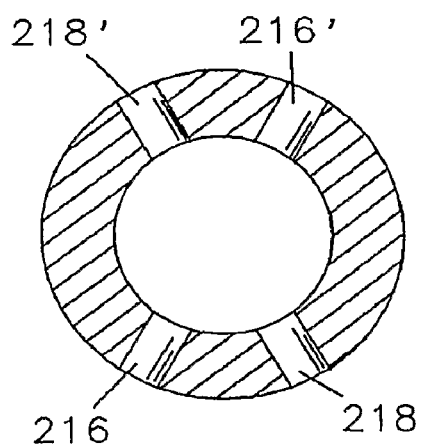
FIG. 28 is a cross sectional view of cylinder with vanes removed, taken along the line I-I of FIG. 2, illustrating intake and exhaust arrangements of a compressor application of this invention.
Figure 29:
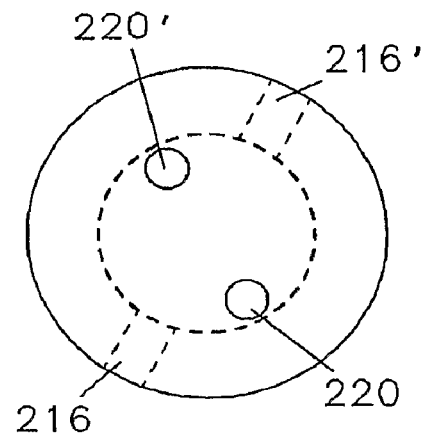
FIGS. 29-33 are views in direction X of FIG. 2, illustrating alternative intake and exhaust arrangements of a compressor application of this invention.

To realize the machine embodying the invention as a four-vane combustion engine, a variety of intake-exhaust port arrangements may be used, as shown in FIGS. 24 to 27. As shown in FIG. 24, an exhaust port 216 and an intake port 218 are located on the periphery of cylinder 110, whereas in an alternative embodiment an exhaust port 222 and an intake port 220 are located in the front face of cylinder 110 as shown in FIG. 26. FIGS. 25 and 27 show other combinations of intake-exhaust port arrangements. A selection of best suitable intake-exhaust port arrangement depends on many factors, such as engine application, and is not limited to those depicted hereto.

In one embodiment as shown in FIG. 23-E, the fluid gallery 93 of the coaxial shaft 92 fluidly communicates with an internal cavity or hollow 95H inside vane 95 via an inlet window 92D and an outlet window 92E. Shaft 92 has a barrier 92F that separates said windows thus governs the direction of fluid flow through hollow 95H. The other coaxial shaft and vanes incorporate similar fluid windows and hollows (not shown). A heat exchanging fluid, such as air, water, antifreeze, lubrication oil, or other gas or liquid can be utilized to heat or cool the vanes and shafts as appropriate.

Figure 30:
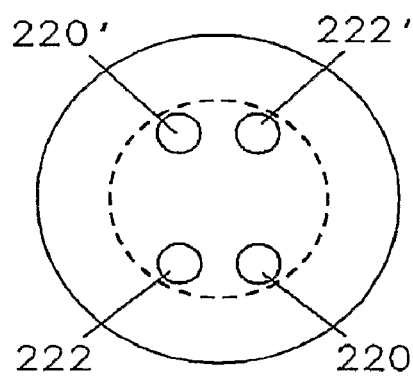
Figure 31:
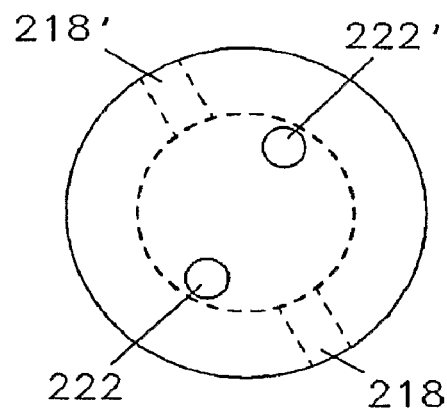
Figure 32:
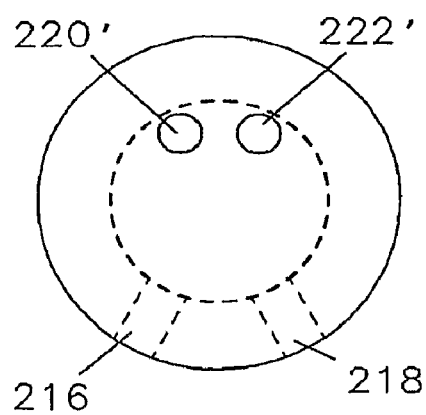
Figure 33:
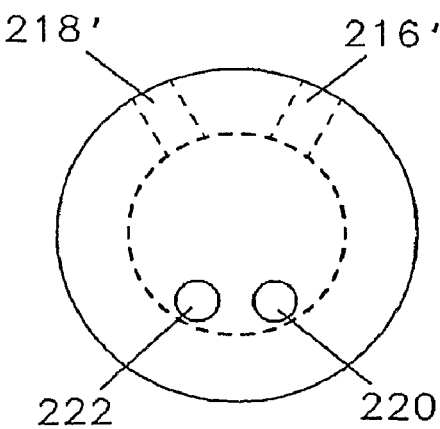

To realize the machine embodying the invention as a four-vane compressor or a pneumatic motor, or a pump, or a hydraulic motor, further referred to as compressors or motors, additional ports are incorporated, generally shown in FIGS. 28 to 33 as 218' and 216' on the periphery, and 220' and 222' on the front face of cylinder 110. To those skilled in art it is apparent that ports 218', and 220' are intake ports while 216' and 222' are exhaust ports. Any combination of port locations, not limited to those depicted in FIGS. 28 to 33 can be used. In a compressor mode, preferred embodiment of a four-vane compressor is shown in FIG. 30.

Figure 34:
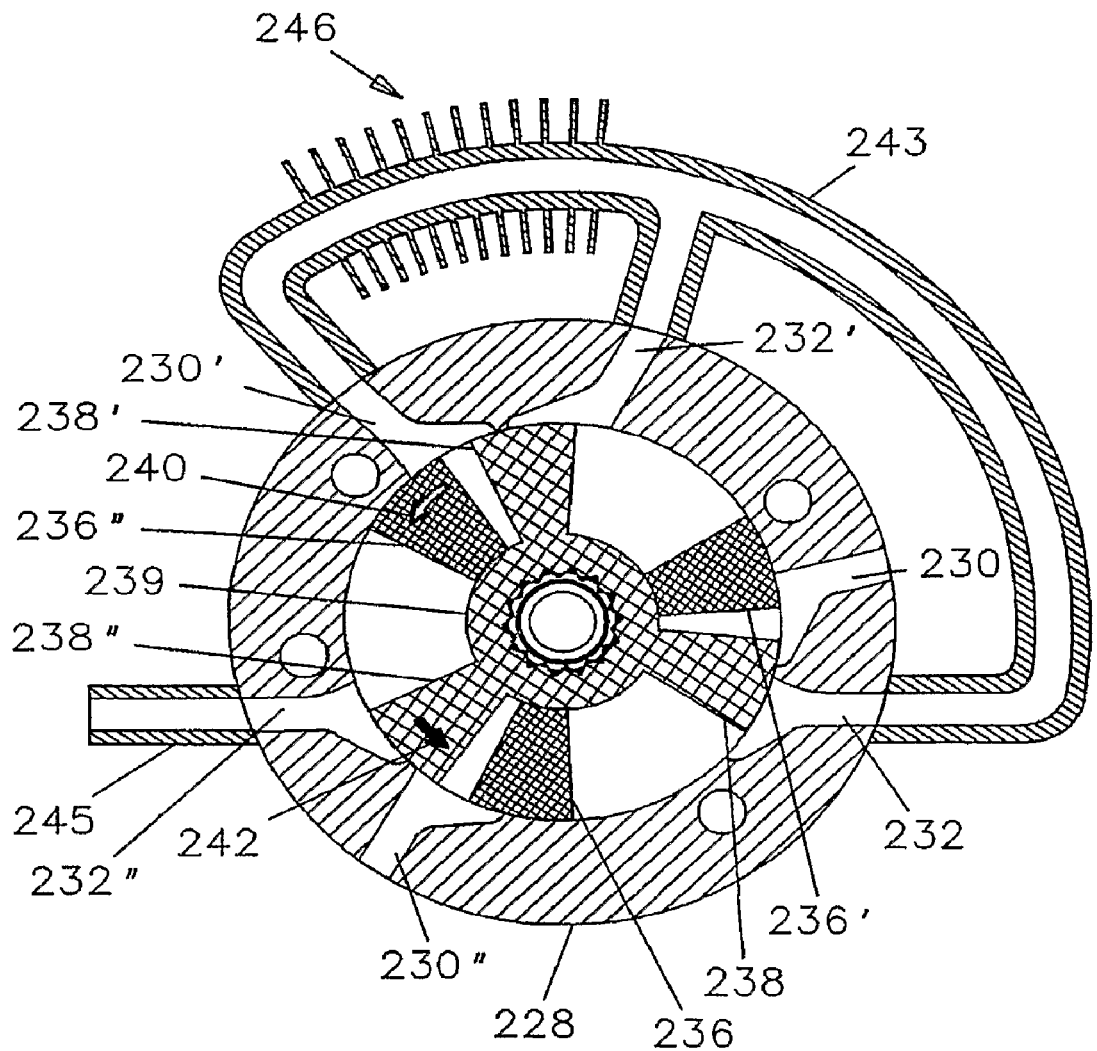
FIG. 34 is a cross sectional view of a preferred embodiment of the six-vane two-stage compressor or hydraulic pump of this invention, taken through intake and exhaust ports.
Figure 35:
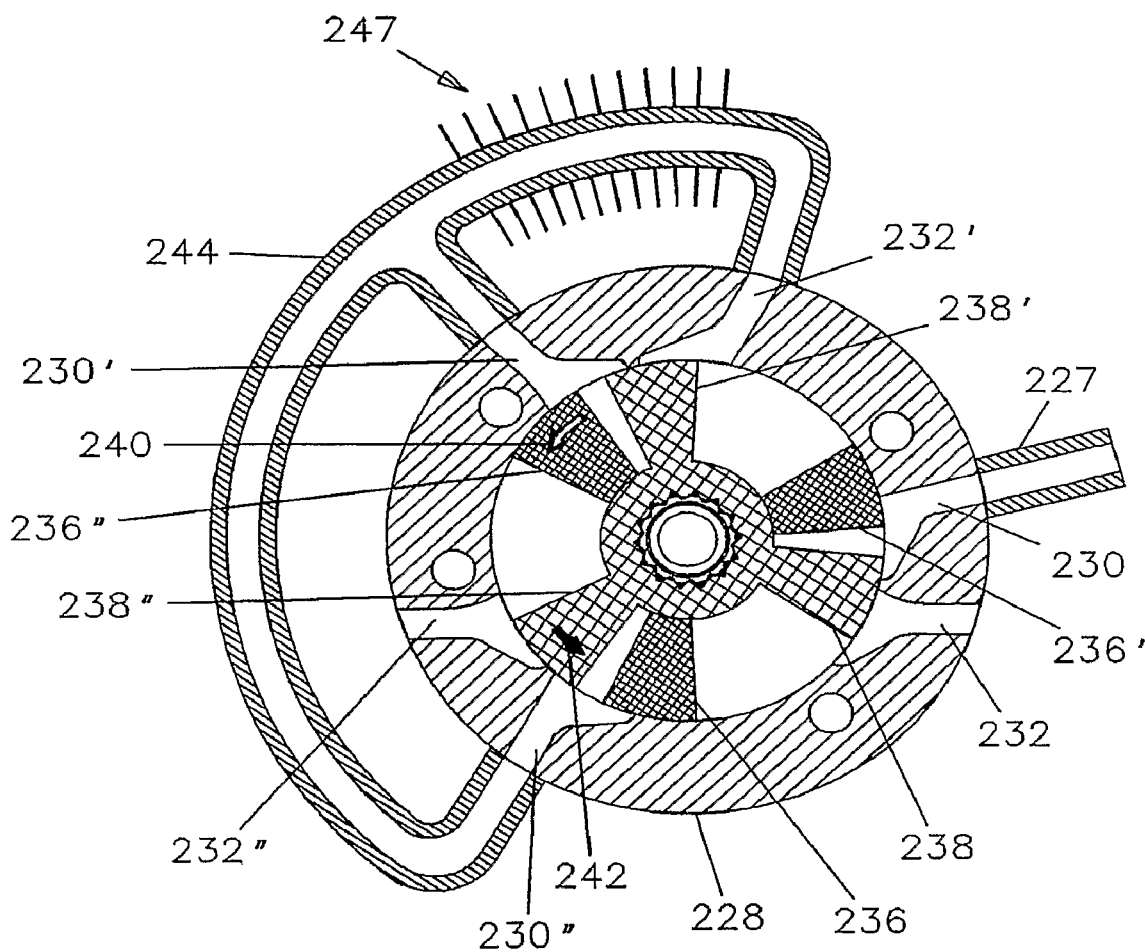
FIG. 35 is a cross sectional view of the mechanism shown in FIG. 34, with ports connected with each other to make it work as a six-vane two-stage fluid motor.

The six-vane cylinder arrangement, as shown in FIG. 34, in combination with cranking mechanism of present invention (not shown), forms a six-vane two-stage compressor. The six vanes form three working chambers between them. Vanes of the six-vane compressor are shown as 236, 236', and 236" being diagonally equally spaced and are integral part of the outer coaxial shaft (not shown). The other three vanes are shown as 238, 238', and 238" being diagonally equally spaced and are integral part of a tube 239. Direction of rotation of vanes 236, 236', and 236" is shown as 240. Direction of rotation of vanes 238, 238', and 238" is shown as 242. The vanes rotate inside cylinder body 228. Intake ports are shown as 230, 230', and 230", and exhaust ports are shown as 232, 232', and 232". A fluid line 243 connects ports 232, 232', and port 230' with each other. The fluid line incorporates a radiator 246. In an alternative embodiment (not shown) heat exchange is facilitated by a water jacket of the cylinder. An exhaust manifold 245 connects with the cylinder, as an extension of exhaust port 232". In another embodiment (not shown), all or some of the ports are placed in the rear face of the cylinder (not shown), similarly to the four-vane compressor that is shown in FIGS. 29 to 33. As shown in FIG. 35, the ports of the preferred embodiment of the six-vane compressor are connected with each other by a fluid line 244 in such a way that when compressed fluid is administered to an inlet manifold 227, the two-stage compressor operates as a two-stage motor. Line 244 also incorporates a heater 247. In another embodiment line 243 from FIG. 35, and line 244 from FIG. 34 are incorporated into the body of cylinder 228, so as they become its integral part (not shown).

Fluid line 243 and fluid line 244 are easily altered (not shown), to make the two-stage compressor and the two-stage motor operate as single-stage compressor and a single-stage motor. Such change to the fluid line is obvious to any person skilled in the art, therefore it is not described hereto.

For quick and easy alternations between compressor and motor modes—fluid line 243, and fluid line 244 is preferably the same component, preferably incorporated into the body of cylinder 228. If fluid line 243, and fluid line 244 is one and the same component, additional valves (not shown) are incorporated into the fluid routing. Such changes are apparent to any person of ordinary skill in the pertinent art.

Figure 37:
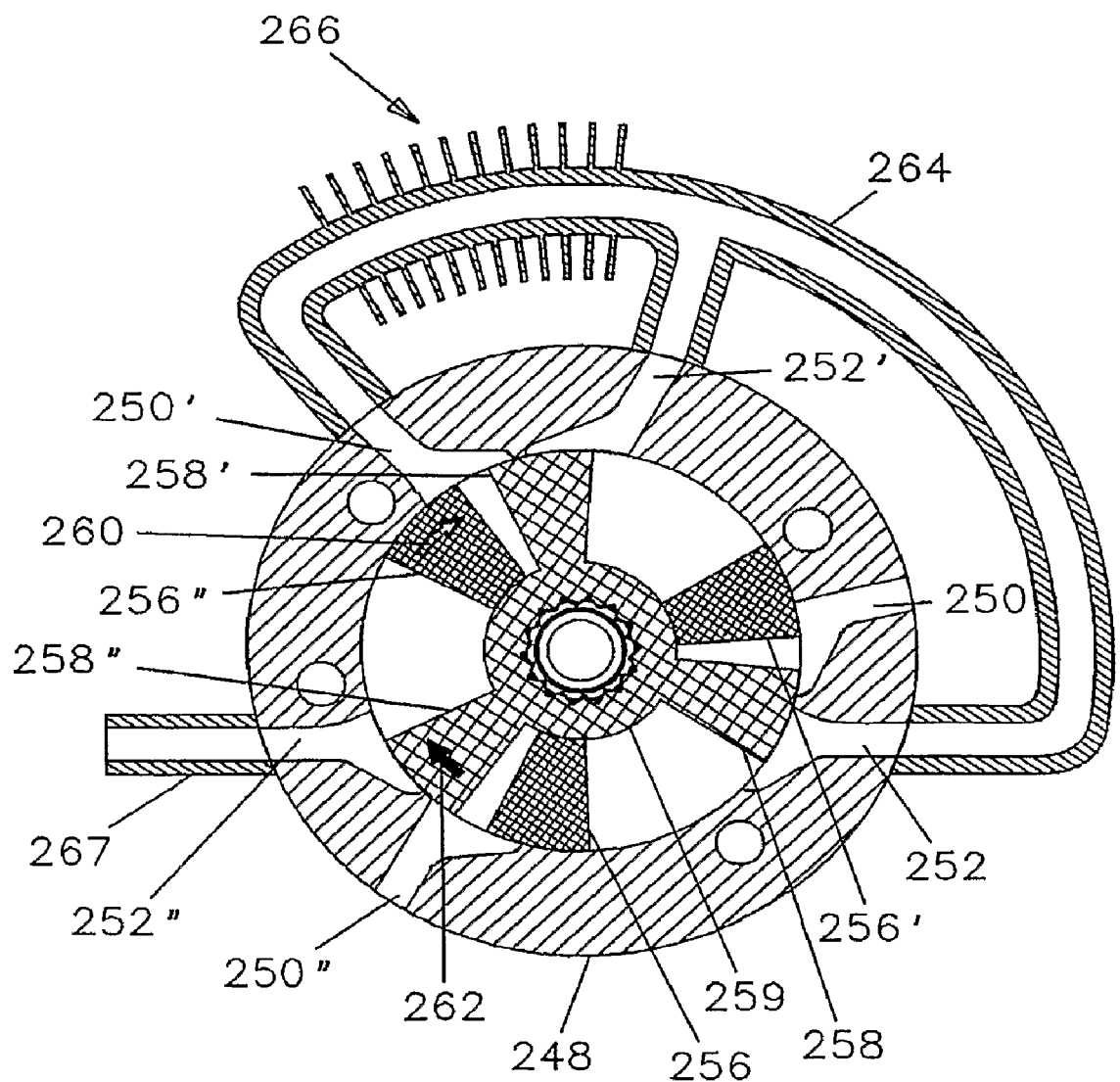
FIG. 37 is a cross sectional view of another embodiment of the six-vane two-stage fluid motor of this invention, taken through intake and exhaust ports.

FIG. 37 shows a six-vane two-stage cylinder arrangement of a motor of present invention, set for vane rotation in the clockwise direction (opposite to motor of FIG. 35). Vanes of the clockwise rotating six-vane motor are shown as 256, 256', and 256" being diagonally equally spaced and are integral part of the outer coaxial shaft (not shown). The other three vanes are shown as 258, 258', and 258" being diagonally equally spaced and are integral part of a tube 259. Direction of rotation of vanes 256, 256', and 256" is shown as 260. Direction of rotation of vanes 258, 258', and 258" is shown as 262. The vanes rotate inside cylinder 248. Exhaust ports are shown as 250, 250', and 250", and intake ports are shown as 252, 252', and 252". Ports 252, 252', and port 250' are connected with each other by a fluid line 264. The fluid line incorporates a heater 266. In an alternative embodiment (not shown) heat exchange is facilitated by a water jacket of the cylinder. An inlet manifold 267 connects with the cylinder, to form an extension of an intake port 252".

Figure 38:
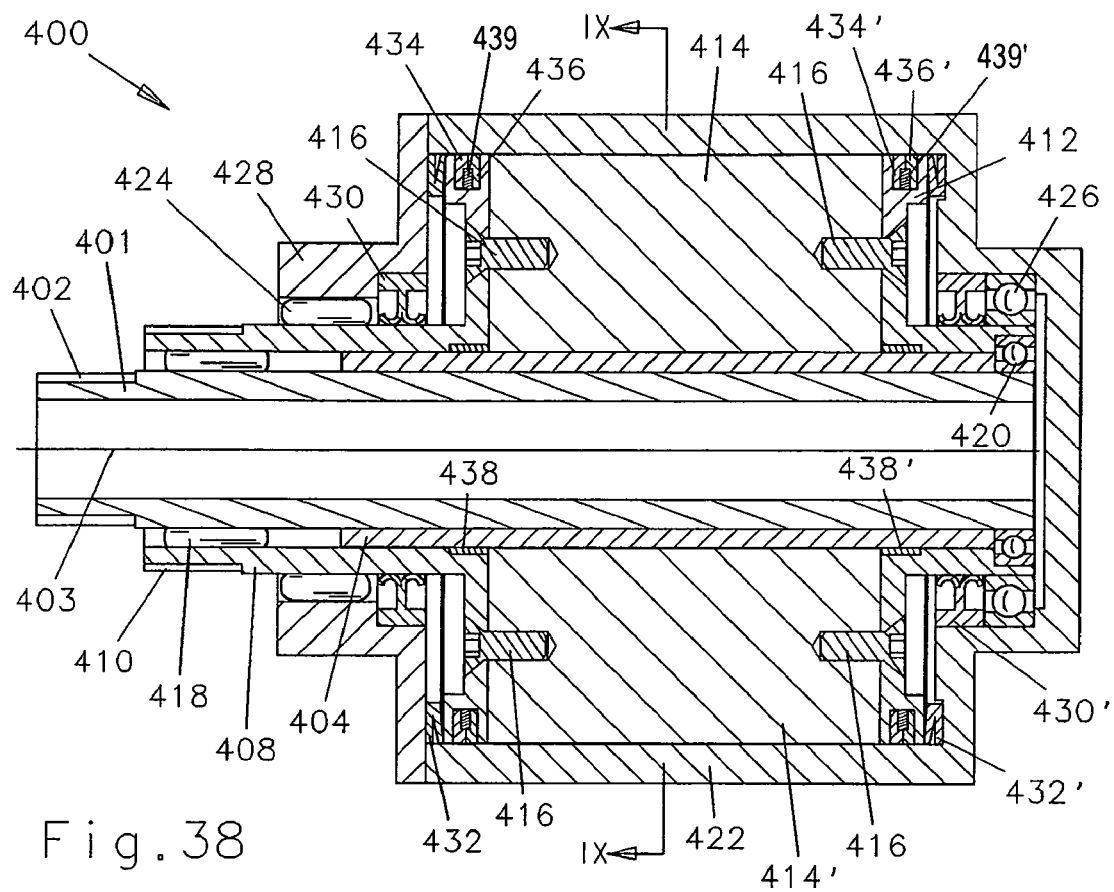
FIG. 38 is a sectional view of alternative embodiment of the four-vane cylinder mechanism taken at the compressor's center.

Another embodiment of this invention has a cylinder and vane arrangement, generally shown as 400 in FIG. 38. Vanes of the cylinder arrangement are shown as 414 and 414' being diagonally opposed and are fixably connected by bolts 416 to an a flanged outer coaxial shaft 408. A flanged shaft 412 is fixably connected to the other end of the vanes by addition bolts 416. Outer shaft 408, vanes 414 and 414', and shaft 412 form an integral part that has a common center line 403. The flange portions of the shafts 408 and 412 form axial wall boundaries of the control volume of the cylinder and vane arrangement 400. Two other vanes (best shown in FIG. 39) are shown as 406 and 406' being diagonally opposed and are an integral part of a tube 404. Tube 404 is pressed over an inner coaxial shaft 401. Shaft 401 has external splines 402 formed on a partial length of its outside diameter (FIG. 38). Shaft 408 has splines 410 formed on a partial length of its outside diameter. As a result, the vanes 414 and 414' are driven by shaft 408, and vanes 406 and 406' are driven by shaft 401. Vanes 406 and 406' may also be attached to tube 404 by other means known in prior art, such as bolts, weld, keys, wedges. The vanes may also be directly attached to shaft 401 (not shown). If the vanes are attached directly to shaft 401, the shaft is made as a stepped shaft (not shown).

Shaft 401 is rotatably contained in shaft 408, wherein it is mounted in an anti-friction bearing 418, and an antifriction bearing 420. Shaft 408 is rotatably mounted in a bearing 424. Bearing 424 is contained in a cylinder wall 428. Flanged shaft 412 is rotatably mounted in an antifriction bearing 426. Bearing 426 is also contained in a cylinder 422. In another embodiment (not shown) shaft 401 is extended behind bearing 420, and bearing 426 is mounted on shaft 401 and contained in cylinder 422.

Figure 39:
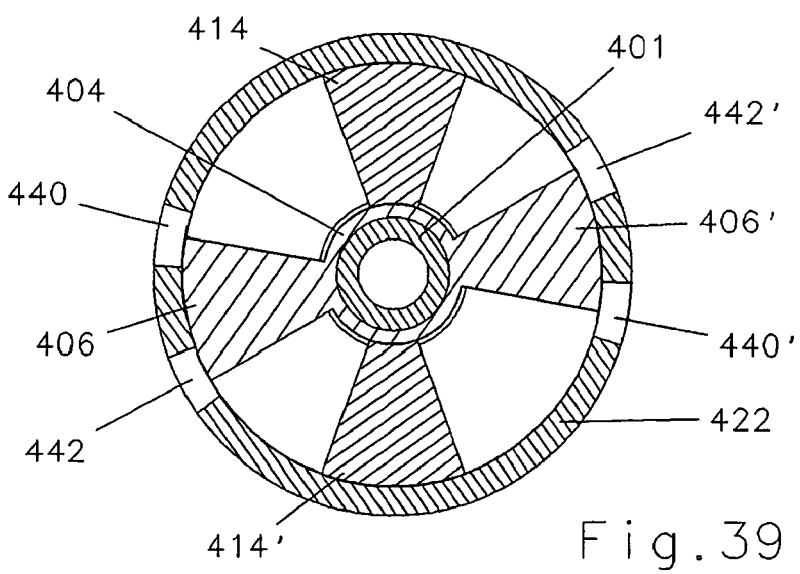
FIG. 39 is a cross sectional view of alternative embodiment of the four-vane cylinder mechanism taken along the line IX-IX of FIG. 38.

To facilitate fluid exchange, cylinder 422 has an intake port 442 and an intake port 442' (FIG. 39). The cylinder also has an exhaust port 440 and an exhaust port 440'.

Sealing of cylinder arrangement 400 is accomplished by a piston ring 434, and a piston ring 436 disposed in a grove of flanged shaft 408. The rings seal radially against cylindrical surface of cylinder 422. The rings are pushed against the walls of the groove they are in by a spring 439 sandwiched between the rings thus sealing the groove axially. The spring can be of any suitable type, such as a wave spring, spring washer, or an elastomeric ring. The piston rings can be made of any suitable material. For instance, they can be made of cast iron, bronze, spring steel, plastic, carbon, graphite, and ceramics. The other side of cylinder is being sealed by pistons rings 434' and 436' disposed in a groove of a flanged shaft 412. These rings are being pushed against the walls of the groove they are in by a spring 439. Additional sealing is accomplished by a face seal 432 sandwiched between shaft 408 and cylinder wall 428, and by a face seal 432' that is sandwiched between shaft 412 and cylinder 422. Preferred material for the face seals is elastomeric type, such as Nitrile rubber, Viton, or Teflon. The face seals may be of a spring loaded type. Tube 404 is sealed by a seal 438. Seal 438 is contained in a recess of shaft 408. The other end of tube 404 is sealed by a seal 438' that is contained in a recess of shaft 412. Seals 438 and 438' are preferably made of plastic, graphite, carbon or bronze in a form of a sleeve. In another embodiment (not shown), seals 438 and 438' are contained in grooves of tube 404. To contain oil that lubricates bearings, an oil seal 430 is retained in cylinder wall 428 (FIG. 38). Oil seal 430 seals against rotating shaft 408. Shaft 412 is sealed by an oil seal 430'. The seal is mounted in cylinder 422. Both oil seals are preferably standard spring loaded type oil seals, but they may be provided as packing. If seals operate at high temperature other types of seals may be used, especially carbon, graphite or ceramic seals.

Figure 40:
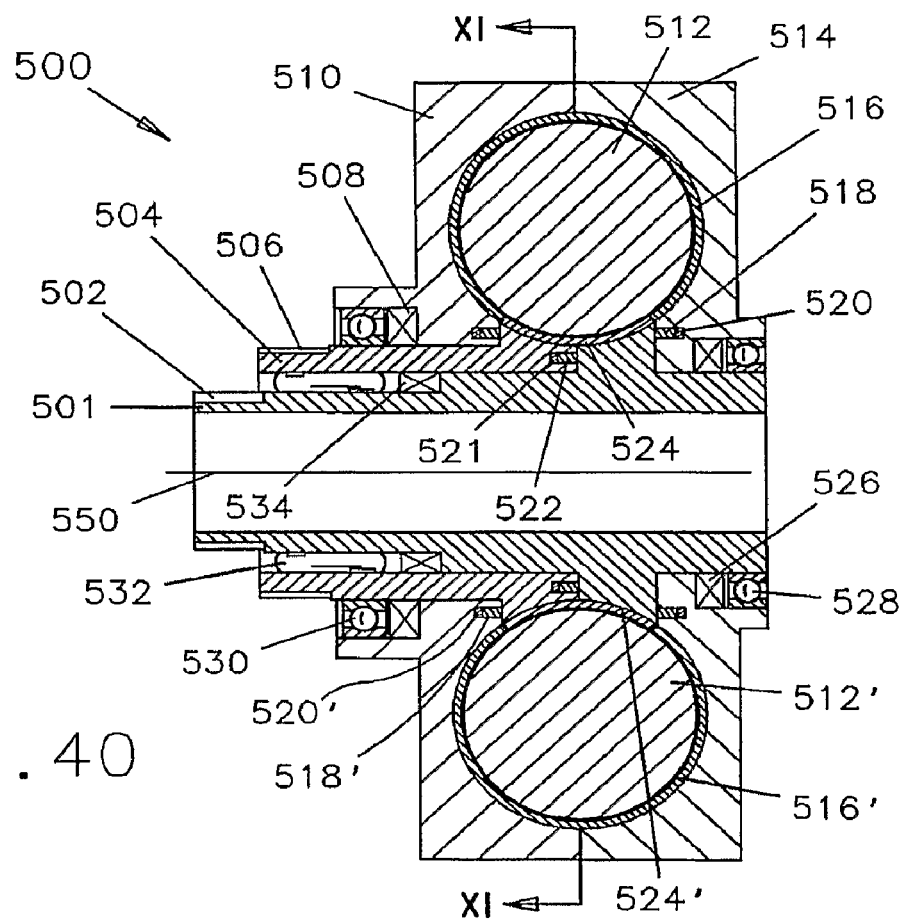
FIG. 40 is a sectional view of yet another embodiment of the four-vane cylinder mechanism taken at engines center.
Figure 41:
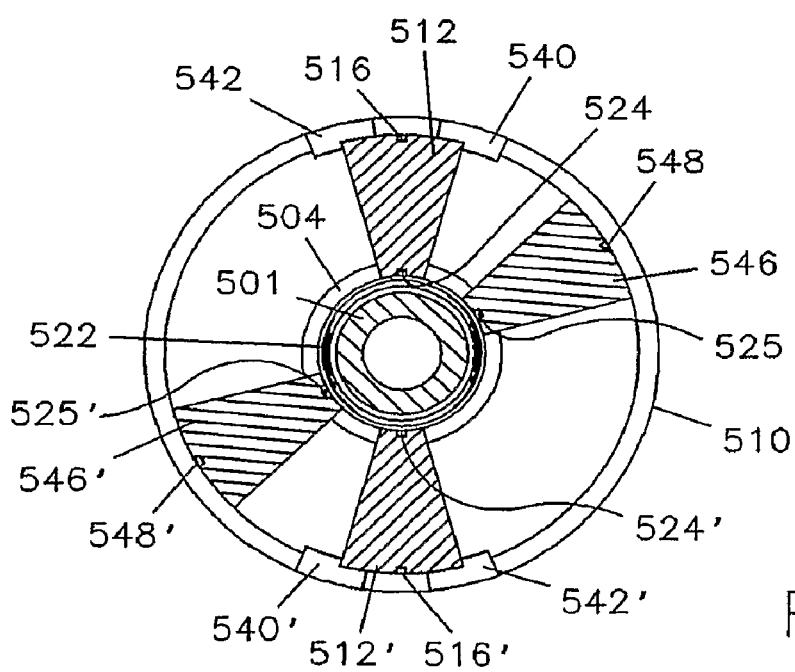
FIG. 41 is a cross sectional view of another embodiment of the four-vane cylinder mechanism taken along the line XI-XI of FIG. 40.

Another embodiment of this invention has a cylinder and vane arrangement, generally shown in FIG. 40 as 500. Vanes of the cylinder arrangement are shown as 512 and 512' being diagonally opposed and are commonly attached (not shown) to an outer coaxial shaft 504. Two other vanes (best shown in FIG. 41) are shown as 546 and 546' being diagonally opposed and are commonly attached (not shown) to an inner coaxial shaft 501. As a result, vanes 512 and 512' are driven by shaft 504, whereas vanes 546 and 546' are driven by shaft 501. As shown in FIG. 40, shaft 501 has external splines 502 formed on a partial length of its outside diameter. In addition, shaft 504 has external splines 506 formed on one end of the shaft.

Shaft 501 is rotatably contained in shaft 504, wherein it is mounted in an anti-friction bearing 532. The other end of shaft 501 is rotatably contained in a bearing 528. The outer diameter of bearing 528 is contained in a cylinder segment 514. Shaft 504 is rotatably mounted in a bearing 530. The outer diameter of bearing 530 is contained in a cylinder segment 510. Consequently, the shafts revolve around a center line 550. A sealing ring 518 sits inside a groove of cylinder segment 514, and is being pushed against flange on shaft 501 by a spring 520. Another sealing ring 518' sits inside a groove of cylinder segment 510, and is being pushed against flange on shaft 504 by a spring 520'. A sealing ring 522 sits inside a groove of shaft 504, and is being pushed against flange on shaft 501 by a spring 521. Springs 520, 520', and 521 are preferably wave springs. The sealing rings are preferably piston ring type seals made of cast iron or carbon. If sealing rings operate at low temperature, below 150 degrees C., they can be made of engineered plastics such as Derlin, Nylon, and Peek. For higher temperatures Teflon, carbon or ceramic coated metal is preferred.

Cylinder and vane arrangement 500 has intake ports 542 and 542' and exhaust ports 540 and 540'.

Vane 512 has a radial groove that slidingly contains a piston ring 516. The ring has a large gap that is filled by a ring segment 524. Piston ring 516 seals against the surfaces of cylinder segment 510 and 514. Also vane 512' has a radial groove that slidingly contains a piston ring 516', and ring segment 524'. Vane 546 has a radial groove that contains a piston ring 548, and a ring segment 525, whereas vane 546' has a radial groove that slidingly contains a piston ring 548', and a ring segment 525'. All the rings and ring segments are preferably made of cast iron or carbon. The rings may also be coated with ceramic materials. If rings work at low temperature, below 150 C, they may be made of plastic materials such as Derlin or Nylon. For higher temperatures, Teflon or carbon is preferred.

To contain oil that lubricates bearings, a seal 534 is retained in a recess of cylinder segment 510. Seal 530 slidingly seals surface of shaft 504. A seal 526 is retained in cylinder segment 514, to slidingly seal surface of shaft 501. Seals 508 and 526 are preferably radial lip oil type seals or packings.

A diagram of preferred embodiment of valves and fluid lines arrangement in a six-vane two-stage compressor-motor combination of present invention is shown in FIG. 36-A, and in FIG. 36-B. A compressor-motor cylinder mechanism is generally shown as 270. FIG. 36-A, and FIG. 36-B diagrammatically show a fluid line 280, a fluid line 282, a fluid line 284, and a fluid line 286, connecting cylinder ports with an accumulator tank 272. As shown in FIG. 36-A, mechanism 270 has a valve 274, a valve 276, and a valve 278 set for operation as a two-stage fluid motor. As shown in FIG. 36-B, mechanism 270 has a valve 274', a valve 276', and a valve 278' set for operation as a two-stage fluid compressor. By flipping the valves to the positions shown in FIG. 36-A, compressed fluid from accumulator tank 272 drives mechanism 270. When the valves are set in the positions as shown in FIG. 36-B, the mechanism 270 compresses fluid into the accumulator tank. Direction of rotation of vanes is shown as 288.

Fluid line routing, position of valves, and type of valves depend on the number of vanes, and on the number of compression/decompression stages in the present invention. For this reason, and because there is a large number of possible combinations, fluid line routing, valve position, and type of valves are not discussed for each and every combination. Based on the fluid line routing, valve position, and type of valves disclosed hereto, it becomes apparent for any person skilled in the art, how to arrange fluid routing and valve system for any combination of vanes and any number of compression or decompression stages.

As shown in FIG. 11-A, the distance between axis of pinion 56C and axis of output shaft 54C is shown as D1. Distance between center hole 57C and axis of pinion 56C is shown as D2. Distance of axis of pinion 56C and center hole 57'C is shown as D3. In a preferred embodiment of a four-vane mechanism, D2 equals D3. By changing values of distances D1, D2, D3, D4, and by changing ratios between these values—different vane phasing, different angular strokes, different maximum displacement between vanes, and different acceleration of vanes is realized. In a preferred embodiment of a four-vane invention, the ratio between D2 and D1 is between 2.5 and 4.5, and distance D1 is equal to the pitch radius of gear 56A.

Figure 42:
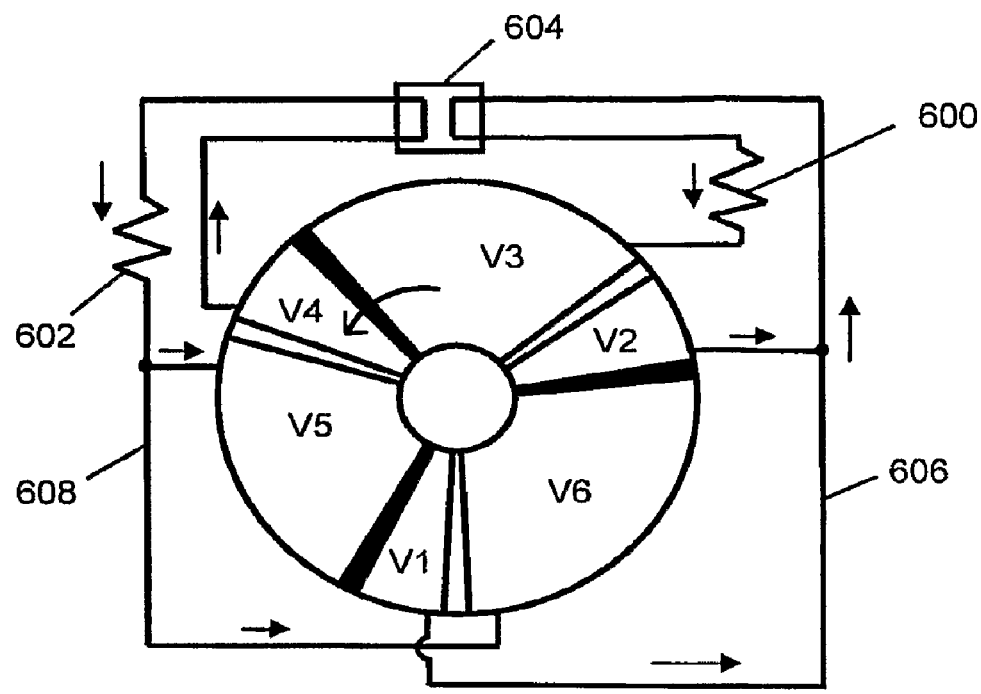
FIGS. 42 and 43 are schematic views of the present invention used as an external combustion engine.

The present invention may also be used as a steam engine, or as an external combustion engine, such as the Stirling cycle engine, or the Rankin cycle engine. FIG. 42 shows one of many possible embodiments of an external combustion engine with a six-vane machine of present invention. Volume from chamber V1 and V2 is being compressed into chamber V3 via a pneumatic line 606. The transferred volume from chamber V1 and V2 goes through a heat exchanger-regenerator designated as 604. Before entering chamber V3 the transferred volume goes through a cooler 600. At the same time volume from chamber V4 is transferred through heat exchanger-regenerator 604 and then through a heater 602 and goes into a chamber V5 and a chamber V6. An external combustion engine is not limited to six vane rotary machine of this invention.

Figure 43:
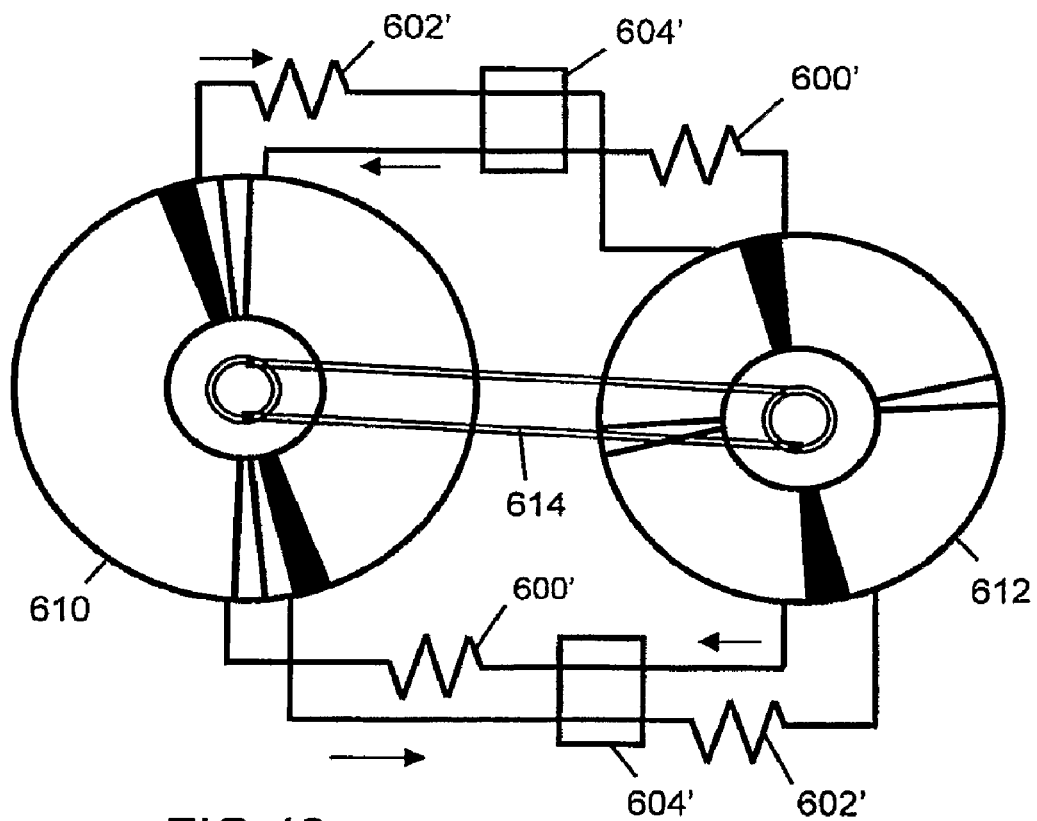

FIG. 43 shows an embodiment of a two machine combination of present invention that operates as an external combustion engine. Output shaft of a four vane rotary machine 610 is connected via a transmission belt 614 with an output shaft of another four vane machine 612 of present invention. The vanes of both machines have a phase shift of 90 degrees. In another embodiment (not shown), the vanes are phase shifted by a different angle from 0 to 180 degrees. In this embodiment gas from one chamber of machine 610 is displaced to a chamber in machine 612 via a heat exchanger 604' and a heater 602'. At the same time gas from a chamber of machine 612 is displaced to a chamber in machine 610 via the heat exchanger 604' and a cooler 600. The same process happens in the remaining chambers of machine 610 and 612 as shown in FIG. 43. In another embodiment (not shown), the machines have more than four vanes each. In yet another embodiment (not shown) the output shafts of both machines are connected directly. In yet another embodiment (not shown) the shafts are connected by spur gears. In yet another embodiment (not shown), each is driven by a separate electric motor. An electrical connection between the rotary machines provides the ultimate flexibility in providing an "on demand" phase shift between the output shafts of the two devices (as oppose to a rigid-constant angular phase shift). A phase shift that provides maximum power is different from the phase shift that provides maximum efficiency. Sometimes it is preferable to have more power at the expense of efficiency, sometimes the opposite. The electrical connection provides greater flexibility in varying the phase shift than a mechanical connection.

Figure 44:
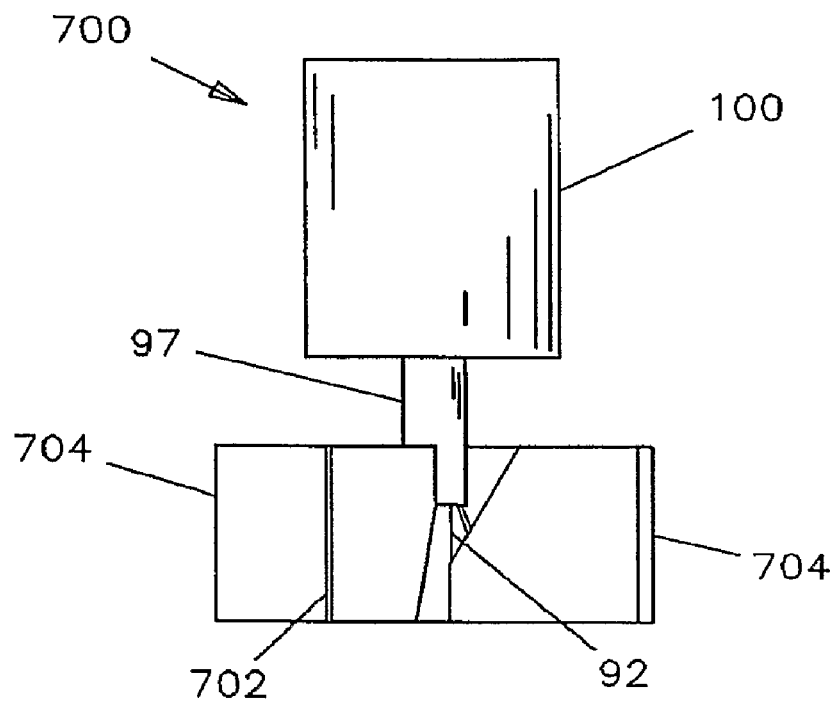
FIGS. 44 and 45 are schematic side elevational and top views of the present invention used as a mixer, grinder, or agitator.
Figure 45:
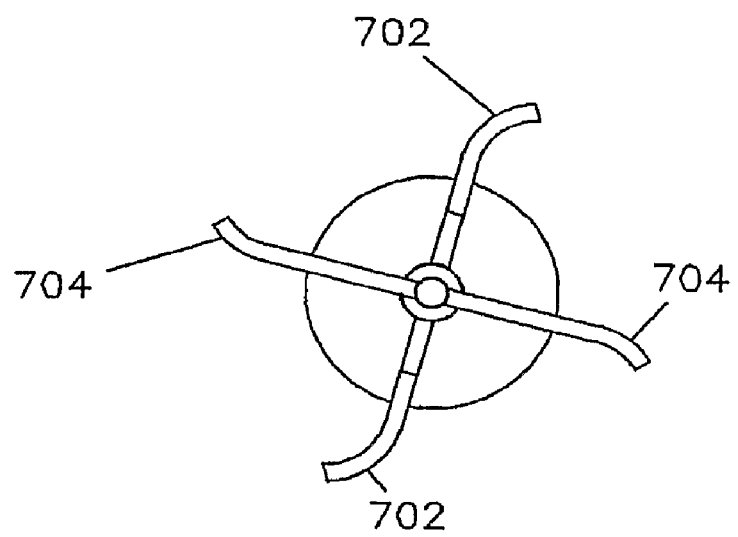

Referring to FIGS. 44 and 45 a material work processor such as mixer, grinder, or agitator or other like machine arrangement 700 of the present invention is schematically shown with a cranking mechanism 100 connected with inner and outer coaxial shafts 92 and 97. Shafts 92 and 92 are both connected with multiple work performing arms 702 and 704 to impact a designated material.

While preferred embodiments of the present invention have been disclosed, it is to be understood it has been described by way of example only, and various modifications can be made without departing from the spirit and scope of the invention as it is encompassed in the following claims.

The invention claimed is:

1. A rotary machine having rotating forward and rearward work members having cyclic non-constant angle motion there between, said machine comprising:
    a rotating shaft;
    a first gear eccentrically mounted and coaxially rotatively carried by said rotating shaft;
    a reaction gear in mesh with said first gear causing said first gear to rotate with respect to said rotating shaft;
    first and second connecting rods pivotally connected with said first gear;
    first and second crank arms pivotally connected with said respective first and second connecting rods; and first and second coaxial shafts connected with said respective first and second first crank arms, said first shaft being connected with at least one said forward work member and said second shaft being connected with at least one said rearward work member.

2. The rotary machine as described in claim 1 wherein an angular position of any work member's maximum and minimum velocity is constant regardless of an angular velocity of said rotating shaft.

3. The rotary machine as described as described in claim 1 wherein a circumferential position of a work member's maximum and minimum velocity is adjustable during operation by adjustment of an angular position of said reaction gear.

4. The rotary machine as described in claim 1 wherein said gear is angularly adjustable.

5. The rotary machine as described in claim 1 wherein said first and second shafts have multiple work members connected thereto.

6. The rotary machine as described in claim 1 further including an annular control volume bifurcated by at least one forward work member vane and at least one rearward work member vane.

7. The rotary machine as described in claim 1 wherein said first gear has a disk and said first gear has gear teeth on a stem eccentrically mounted within a cavity of said rotating shaft.

8. The rotary machine as described in claim 7 wherein said rotating shaft cavity with a window and said teeth of said first gear are exposed to said reaction gear externally through said window.

9. The rotary machine as described in claim 7 wherein said first gear has teeth along said disk.

10. The rotary machine as described in claim 1 wherein said connecting rods pivot in the same transverse plane.

11. The rotary machine as described in claim 1 wherein said reduction gear includes halves that are adjustably connected to alleviate backlash with said first gear.

12. The rotary machine as described in claim 1 wherein said rotating shaft has a counterweight connected thereto.

13. The rotary machine as described in claim 1 wherein said reaction gear includes an inner member with a conical outer surface adjustably connected within an outer member.

14. The rotary machine as described in claim 1 wherein said work members are vanes and wherein at least one of said vanes is fixed with respect to a wall forming a boundary for said control volume.

15. The rotary machine as described in claim 1 having at least two forward work arms juxtaposed by two rearward work arms wherein at least on of said work arms has an external cavity portion forming a combustion chamber when said work arm is closely adjacent another work arm.

16. The rotary machine as described in claim 1 having at least two forward work arms juxtaposed by two rearward work arms wherein said work arms have an internal cavity for a heat exchanging fluid.

17. The rotary machine as described in claim 16 wherein said work arm internal cavity is fluidly connected with one of said coaxial shafts.

18. The rotary mechanism as described in claim 1, wherein teeth of said first gear and teeth of said reaction gear are tapered through a continuous teeth profile shifting toward centerlines of said gears to alleviate backlash between said first and reaction gear.

19. A rotary compressor-motor having an annular control volume bifurcated by at least two forward vanes juxtaposed by one of at least two rearward vanes, said forward and rearward vanes having a cyclic non-constant angle there between, said rotary compressor-motor comprising:
  a rotating shaft;
  a first gear having a disk with a stem eccentrically mounted within a cavity of said rotating shaft and coaxially rotated by said rotating shaft;
  a reaction gear external to said first gear in mesh with said first gear causing said first gear to rotate with respect to said rotating shaft;
  first and second connecting rods pivotally connected with said first gear;
  first and second crank arms pivotally connected with said respective first and connecting rods; and
  first and second coaxial shafts connected said respective first and second first crank arms, said first shaft being connected with said forward vanes and said second shaft being connected with said rearward vanes.

20. A multiple stage rotary scissors action compressible fluid machine comprising:
  a first working chamber defined by forward and rearward scissors action work members bifurcating a control volume;
  at least two additional chambers defined by forward and rearward scissors action work members bifurcating said control volume, said additional chambers being fluidly connected with said first stage, and wherein said compressible fluid machine includes a rotating shaft;
  a first gear eccentrically mounted and coaxially rotatively carried by said rotating shaft;
  a reaction gear in mesh with said first gear causing said first gear to rotate with respect to said rotating shaft;
  first and second connecting rods pivotally connected with said first gear;
  first and second crank arms pivotally connected with said respective first and second connecting rods; and
  first and second coaxial shafts connected with said respective first and second first crank arms, said first shaft being connected with at least one said forward work member and said second shaft being connected with at least one said rearward work member.

* * * * *